United States Patent
Little

(10) Patent No.: US 10,263,647 B2
(45) Date of Patent: Apr. 16, 2019

(54) MULTIPLEXING ARCHITECTURES FOR WIRELESS APPLICATIONS

(71) Applicant: SKYWORKS SOLUTIONS, INC., Woburn, MA (US)

(72) Inventor: Christopher Robert Little, Gilroy, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/482,774

(22) Filed: Apr. 9, 2017

(65) Prior Publication Data

US 2017/0338839 A1 Nov. 23, 2017

Related U.S. Application Data

(60) Provisional application No. 62/320,485, filed on Apr. 9, 2016.

(51) Int. Cl.
| | |
|---|---|
| *H04B 1/00* | (2006.01) |
| *H04B 1/04* | (2006.01) |
| *H04B 1/56* | (2006.01) |
| *H04L 5/14* | (2006.01) |

(52) U.S. Cl.
CPC ......... *H04B 1/0057* (2013.01); *H04B 1/0458* (2013.01); *H04B 1/56* (2013.01); *H04L 5/1423* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0079648 | A1* | 4/2008 | Forstner | H01P 1/213 343/850 |
| 2011/0298537 | A1* | 12/2011 | Homol | H03F 3/72 330/124 R |
| 2013/0273860 | A1* | 10/2013 | Pehlke | H04B 1/44 455/78 |
| 2014/0028521 | A1* | 1/2014 | Bauder | H03H 7/38 343/861 |
| 2014/0030990 | A1* | 1/2014 | Smith | H04B 1/0475 455/114.1 |
| 2015/0105032 | A1* | 4/2015 | Wang | H03K 17/161 455/77 |
| 2015/0133067 | A1* | 5/2015 | Chang | H04B 1/48 455/78 |

(Continued)

*Primary Examiner* — Cindy Trandai
(74) *Attorney, Agent, or Firm* — Chang & Hale LLP

(57) ABSTRACT

Multiplexing architectures for wireless applications. In some embodiments, a front-end architecture can include a first power amplifier having an output coupled to a transmit filter through a path that is substantially free of a switch. The transmit filter can be configured for a first transmit band or a second transmit band, with the first and second transmit bands at least partially overlapping with each other. The front-end architecture can further include a receive filter configured for at least a first receive band corresponding to the first transmit band, and a second power amplifier having an output capable of being coupled to a first duplexer or a second duplexer through a selector switch. The first duplexer can include a receive portion configured for a second receive band corresponding to the second transmit band.

20 Claims, 18 Drawing Sheets

(56) References Cited

U.S. PATENT DOCUMENTS

| | | | |
|---|---|---|---|
| 2016/0381648 A1* | 12/2016 | Tanaka | H04W 52/52 370/280 |
| 2016/0381649 A1* | 12/2016 | Anthony | H03F 3/24 455/127.2 |
| 2017/0111864 A1* | 4/2017 | Ashworth | H04B 7/15557 |
| 2017/0117358 A1* | 4/2017 | Kim | H01L 21/823481 |

* cited by examiner

MULTIPLEXING ARCHITECTURES FOR WIRELESS APPLICATIONS

CROSS-REFERENCE TO RELATED APPLICATION(S)

This application claims priority to U.S. Provisional Application No. 62/320,485 filed Apr. 9, 2016, entitled MULTIPLEXING ARCHITECTURE HAVING SWITCHED FILTERS, the disclosure of which is hereby expressly incorporated by reference herein in its respective entirety.

BACKGROUND

Field

The present disclosure relates to multiplexing architectures for wireless applications.

Description of the Related Art

In wireless applications, a front-end typically facilitates transmission of a power-amplified signal through an antenna. The same front-end typically facilitates low-noise amplification of a received signal, either from the same antenna or another antenna.

In some wireless applications, transmit and receive operations can be achieved simultaneously through, for example, a duplexer. Such a duplexer typically includes a transmit filter and a receive filter.

In some wireless applications, carrier-aggregation can be implemented with a plurality of frequency bands. For example, signals associated with a plurality of receive bands can be carrier-aggregated to achieve increased throughput of information to a wireless device.

SUMMARY

In accordance with some implementations, the present disclosure relates to a front-end architecture that includes a first power amplifier having an output coupled to a transmit filter through a path that is substantially free of a switch. The transmit filter is configured for a first transmit band or a second transmit band, with the first and second transmit bands at least partially overlapping with each other. The front-end architecture further includes a receive filter configured for at least a first receive band corresponding to the first transmit band, and a second power amplifier having an output capable of being coupled to a first duplexer or a second duplexer through a selector switch. The first duplexer includes a receive portion configured for a second receive band corresponding to the second transmit band.

In some embodiments, the receive filter can be further configured for a third receive band. The first duplexer associated with the second power amplifier can further include a transmit portion configured for a third transmit band corresponding to the third receive band. The second duplexer associated with the second power amplifier can include a transmit portion configured for a fourth transmit band and a receive portion configured for a fourth receive band corresponding to the fourth transmit band.

In some embodiments, the front-end architecture can further include a third power amplifier having an output capable of being coupled to a first duplexer or a second duplexer through a selector switch. The first duplexer associated with the third power amplifier can include a transmit portion configured for a fifth transmit band and a receive portion configured for a fifth receive band corresponding to the fifth transmit band. The second duplexer associated with the third power amplifier can include a transmit portion configured for a sixth transmit band and a receive portion configured for a sixth receive band corresponding to the sixth transmit band. The front-end architecture can be configured to allow a transmit operation for a selected transmit band among the six transmit bands, and a carrier-aggregation operation for a plurality of selected receive bands among the six receive bands.

In some embodiments, the front-end architecture can further include an assembly of antenna switches implemented to selectively connect an antenna port to one or more of the transmit filter, the receive filter, the first and second duplexers associated with the second power amplifier, and the first and second duplexers associated with the third power amplifier. The assembly of antenna switches can include a single-pole-single-throw switch for each of the transmit filter, the receive filter, the first and second duplexers associated with the second power amplifier, and the first and second duplexers associated with the third power amplifier.

In some embodiments, the first transmit band and the first receive band can be, for example, transmit and receive portions of a B4 cellular band. The second transmit band and the second receive band can be, for example, transmit and receive portions of a B3 cellular band. The third transmit band and the third receive band can be, for example, transmit and receive portions of a B1 cellular band.

In some embodiments, the front-end architecture can further include an impedance matching circuit implemented at an output of the transmit filter and configured to facilitate a high impedance for one or more frequency ranges outside of the first transmit band and the second transmit band of the transmit filter. The impedance matching circuit can include a switchable inductive shunt path to ground. In some embodiments, the front-end architecture can further include an impedance matching circuit implemented at an input of the receive filter and configured to facilitate a high impedance for one or more frequency ranges outside of the first receive band and the third receive band.

In some embodiments, the first transmit band and the first receive band can be transmit and receive portions of a first cellular band, and the second transmit band and the second receive band can be transmit and receive portions of a second cellular band. Each of the first and second cellular bands can be a mid-band or a high-band. In some embodiments, the front-end architecture can further include a low-band path having a low band pass filter configured to filter a low-band signal.

In some teachings, the present disclosure relates to an antenna switch filter module that includes a packaging substrate configured to receive a plurality of components, and a filtering circuit implemented on the packaging substrate. The filtering circuit includes a first signal port coupled to a transmit filter through a path that is substantially free of a switch, with the transmit filter being configured for a first transmit band or a second transmit band. The first and second transmit bands at least partially overlap with each other. The filtering circuit further includes a second signal port coupled to a receive filter that is configured for at least a first receive band corresponding to the first transmit band. The filtering circuit further includes a third signal port and a fourth signal port. The third signal port is coupled to a transmit portion of a first duplexer, and the fourth signal port is coupled to a receive portion of the first duplexer configured for a second receive band corresponding to the second transmit band.

In some implementations, the present disclosure relates to a wireless device that includes a transceiver configured to process signals, and an antenna configured to facilitate transmission and reception of the signals. The wireless device further includes a front-end architecture implemented between the transceiver and the antenna. The front-end architecture includes a first power amplifier having an output coupled to a transmit filter through a path that is substantially free of a switch, with the transmit filter being configured for a first transmit band or a second transmit band, and with the first and second transmit bands at least partially overlapping with each other. The front-end architecture further includes a receive filter configured for at least a first receive band corresponding to the first transmit band. The front-end architecture further includes a second power amplifier having an output capable of being coupled to a first duplexer or a second duplexer through a selector switch, with the first duplexer including a receive portion configured for a second receive band corresponding to the second transmit band.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

High (and growing) band count in communication standards such as Long-Term Evolution (LTE) for wireless devices such as smart phones is placing increasing cost and size requirements on handset designs. Multiplexing multiple filters and/or duplexers with a common antenna port can be implemented to support multiple inter-band carrier-aggregation (CA) combinations. However, such multiplexing configurations can include some undesirable features. For example, increase in losses can occur due to loading.

Figure 1:
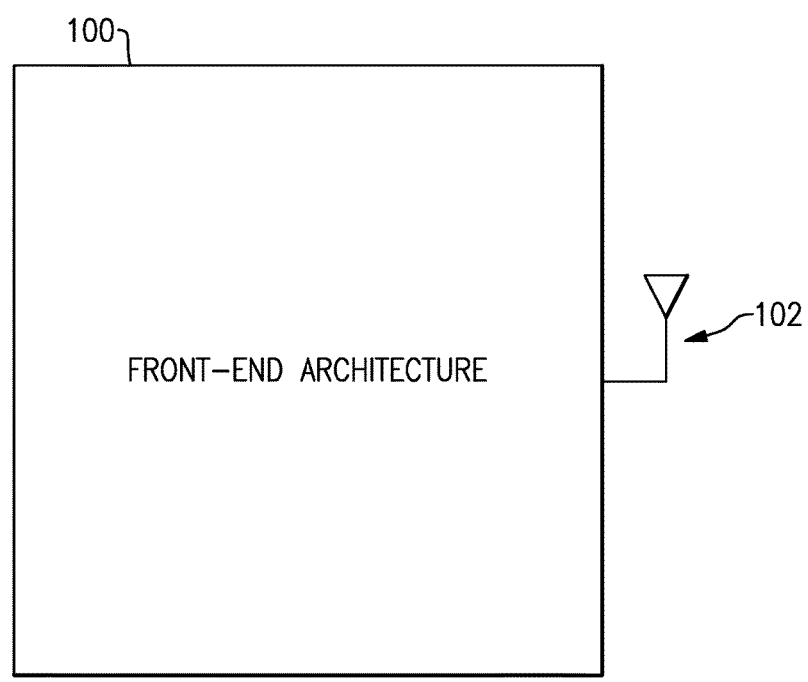
FIG. 1 shows a block diagram of a front-end architecture having one or more features as described herein.

FIG. 1 shows a block diagram of a front-end architecture 100 having one or more features as described herein. Such a front-end architecture can be configured to operate with an antenna 102. As described herein, the front-end architecture 100 of FIG. 1 can be configured to provide frequency-division duplexing (FDD) functionality for each of one or more frequency bands. Additionally, the front-end architecture 100 of FIG. 1 can be configured to provide carrier-aggregation (CA) functionality for a plurality of downlink (DL, or sometimes referred to as receive (Rx)) frequency bands.

In some embodiments, the front-end architecture 100 of FIG. 1 can provide the foregoing functionalities with a reduced number of duplexers and/or filters, as well as a reduced number of switches. Thus, desirable features such as reduced losses can be achieved.

Figure 2:
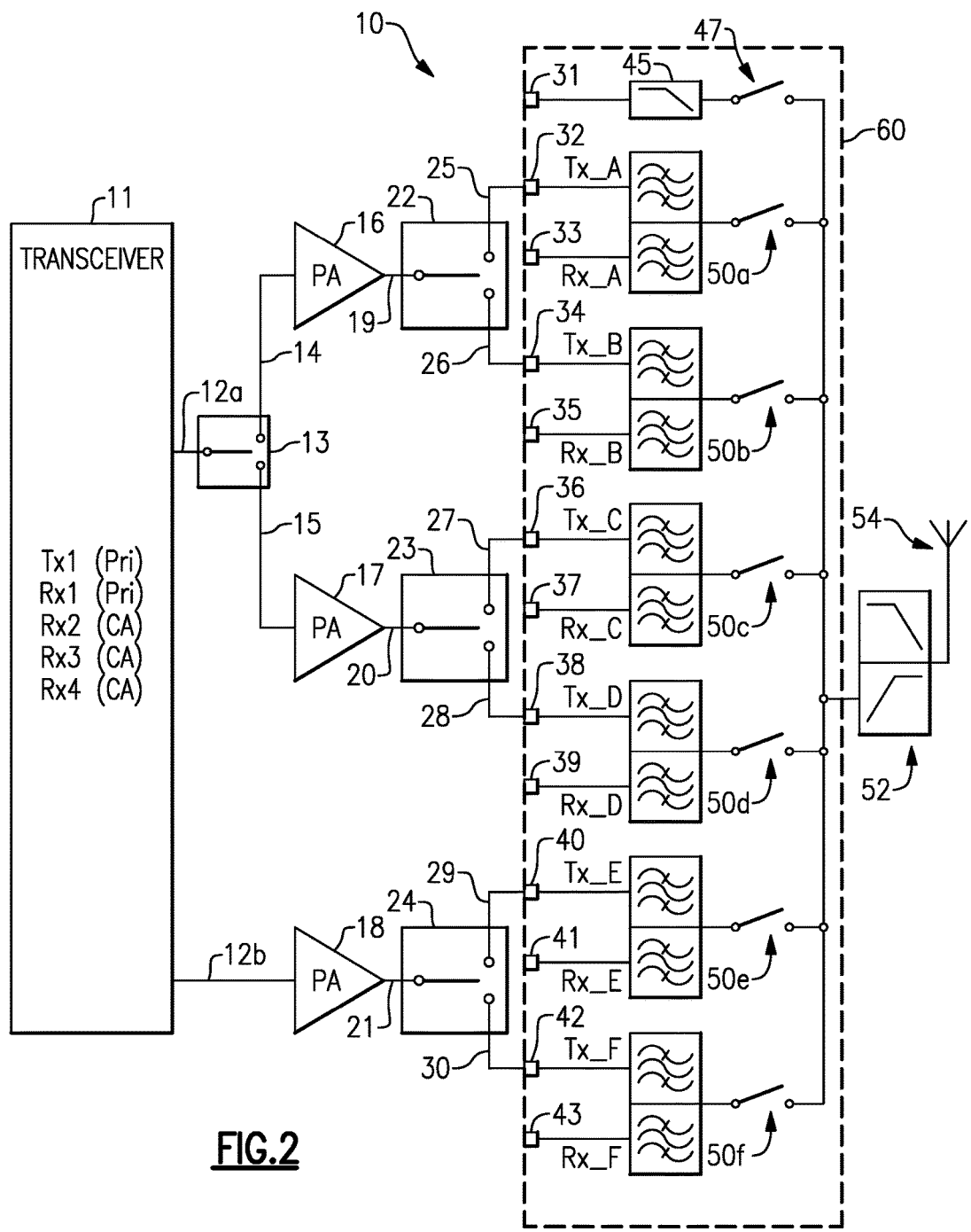
FIG. 2 shows an example front-end architecture that can be in communication with, or include, a transceiver.

FIG. 2 shows an example front-end architecture 10 that can be in communication with, or include, a transceiver 11. Such a transceiver is shown to include, for example, FDD transmit (Tx) and receive (Rx) capability for a primary band. Accordingly, such FDD Tx and Rx bands are indicated as Tx1 and Rx1, respectively.

The transceiver in FIG. 2 is also shown to include, for example, carrier-aggregation (CA) functionality involving three Rx bands (Rx2, Rx3, Rx4). Such Rx bands involved in carrier-aggregation may or may not include the foregoing receive portion (Rx1) of the primary band. It will be understood that, although various examples are described with carrier-aggregation with such three Rx bands, one or more features of the present disclosure can also be implemented with different numbers of Rx bands being carrier-aggregated.

In FIG. 2, the example front-end architecture 10 is shown to include, or be in communication with, three power amplifiers (PAs) 16, 17, 18. Each power amplifier is shown to be coupled to the transceiver 11 directly or through a selection switch. For example, an input of the first power amplifier 16 is shown to be coupled to the transceiver 11 through a signal path 12a, a selector switch 13, and a signal path 14. Similarly, an input of the second power amplifier 17 is shown to be coupled to the transceiver 11 through the signal path 12a, the selector switch 13, and a signal path 15. An input of the third power amplifier 18, however, is shown to be coupled directly to the transceiver 11 through a signal path 12b.

In FIG. 2, an output of each power amplifier (16, 17 or 18) is shown to be capable of being coupled to two duplexers through a respective selector switch. More particularly, an output of the first power amplifier 16 is shown to be coupled to a pole of a first selector switch 22 through a signal path 19. A first throw of the first selector switch 22 is shown to be coupled to a Tx filter (Tx_A) of a first duplexer (A)

through a signal path 25 and a signal port 32. Similarly, a second throw of the first selector switch 22 is shown to be coupled to a Tx filter (Tx_B) of a second duplexer (B) through a signal path 26 and a signal port 34.

Referring to FIG. 2, an output of the second power amplifier 17 is shown to be coupled to a pole of a second selector switch 23 through a signal path 20. A first throw of the second selector switch 23 is shown to be coupled to a Tx filter (Tx_C) of a third duplexer (C) through a signal path 27 and a signal port 36. Similarly, a second throw of the second switch 23 is shown to be coupled to a Tx filter (Tx_D) of a fourth duplexer (D) through a signal path 28 and a signal port 38.

Referring to FIG. 2, an output of the third power amplifier 18 is shown to be coupled to a pole of a third selector switch 24 through a signal path 21. A first throw of the third selector switch 24 is shown to be coupled to a Tx filter (Tx_E) of a fifth duplexer (E) through a signal path 29 and a signal port 40. Similarly, a second throw of the third switch 24 is shown to be coupled to a Tx filter (Tx_F) of a sixth duplexer (F) through a signal path 30 and a signal port 42.

In FIG. 2, each of the six duplexers (A-F) is shown to include a respective Rx filter. More particularly, the first duplexer (A) is shown to include an Rx filter (Rx_A) having an output coupled to a signal port 33. The transmit and receive filters Tx_A, Rx_A of the first duplexer (A) are configured to provide FDD functionality associated with Tx and Rx frequency ranges of the first band.

Referring to FIG. 2, the second duplexer (B) is shown to include an Rx filter (Rx_B) having an output coupled to a signal port 35. The transmit and receive filters Tx_B, Rx_B of the second duplexer (B) are configured to provide FDD functionality associated with Tx and Rx frequency ranges of the second band.

Referring to FIG. 2, the third duplexer (C) is shown to include an Rx filter (Rx_C) having an output coupled to a signal port 37. The transmit and receive filters Tx_C, Rx_C of the third duplexer (C) are configured to provide FDD functionality associated with Tx and Rx frequency ranges of the third band.

Referring to FIG. 2, the fourth duplexer (D) is shown to include an Rx filter (Rx_D) having an output coupled to a signal port 39. The transmit and receive filters Tx_D, Rx_D of the fourth duplexer (D) are configured to provide FDD functionality associated with Tx and Rx frequency ranges of the fourth band.

Referring to FIG. 2, the fifth duplexer (E) is shown to include an Rx filter (Rx_E) having an output coupled to a signal port 41. The transmit and receive filters Tx_E, Rx_E of the fifth duplexer (E) are configured to provide FDD functionality associated with Tx and Rx frequency ranges of the fifth band.

Referring to FIG. 2, the sixth duplexer (F) is shown to include an Rx filter (Rx_F) having an output coupled to a signal port 43. The transmit and receive filters Tx_F, Rx_F of the sixth duplexer (F) are configured to provide FDD functionality associated with Tx and Rx frequency ranges of the sixth band.

In the example of FIG. 2, each of the six Rx signal ports 33, 35, 37, 39, 41, 43 can be in communication with the transceiver 11 through an Rx signal path (not shown in FIG. 2). Such an Rx signal path can include, for example, a low-noise amplifier (LNA). In some embodiments, one LNA can service one or more Rx signal paths.

In the example of FIG. 2, each of the six duplexers (A-F) is shown to be capable of being coupled to an antenna 54 through an antenna switch, an antenna port 48, and an antenna filter 52. More particularly, the first duplexer (A) can be coupled to the antenna 54 through a first antenna switch 50a; the second duplexer (B) can be coupled to the antenna 54 through a second antenna switch 50b; the third duplexer (C) can be coupled to the antenna 54 through a third antenna switch 50c; the fourth duplexer (D) can be coupled to the antenna 54 through a fourth antenna switch 50d; the fifth duplexer (E) can be coupled to the antenna 54 through a fifth antenna switch 50e; and the sixth duplexer (F) can be coupled to the antenna 54 through a sixth antenna switch 50f.

In the example of FIG. 2, the six examples bands (A-F) can be mid-band (MB), high-band (HB), or some combination thereof. Thus, the antenna port 48 is shown to be coupled to the antenna 54 through a high-pass portion of the antenna filter 52. Although various examples are described herein in the context of MB/HB settings, it will be understood that one or more features of the present disclosure can also be implemented with one or more low-bands (LBs).

In some embodiments, an assembly of filters and antenna switches generally included in a box 60 can be implemented in an antenna switch filter module. In some embodiments, such an antenna switch filter module can also include one or more LB signal paths. For example, a low-pass filter 45 is shown to be implemented between a signal port 31 and an antenna switch 47. In some embodiments, such an antenna switch can be coupled to the antenna 54 through a low-band portion of the antenna filter 52.

FIGS. 3A-3C and 4A-4C show a more specific example of the front-end architecture 10 of FIG. 2. In each of FIGS. 3A-3C and 4A-4C, a front-end architecture 10 is configured such that the generic six bands of FIG. 2 are implemented as example cellular frequency bands as listed in Table 1. It will be understood that one or more features of the present disclosure can also be implemented utilizing other cellular frequency bands.

TABLE 1

| Band (FIG. 2) | Band (FIGS. 3, 4) | Tx Freq. Range (MHz) | Rx Freq. Range (MHz) |
|---|---|---|---|
| A | B3 | 1,710-1,785 | 1,805-1,880 |
| B | B4 | 1,710-1,755 | 2,110-2,155 |
| C | B1 | 1,920-1,980 | 2,110-2,170 |
| D | B25 | 1,850-1,915 | 1,930-1,995 |
| E | B30 | 2,305-2,315 | 2,350-2,360 |
| F | B7 | 2,500-2,570 | 2,620-2,690 |

Figure 3A:
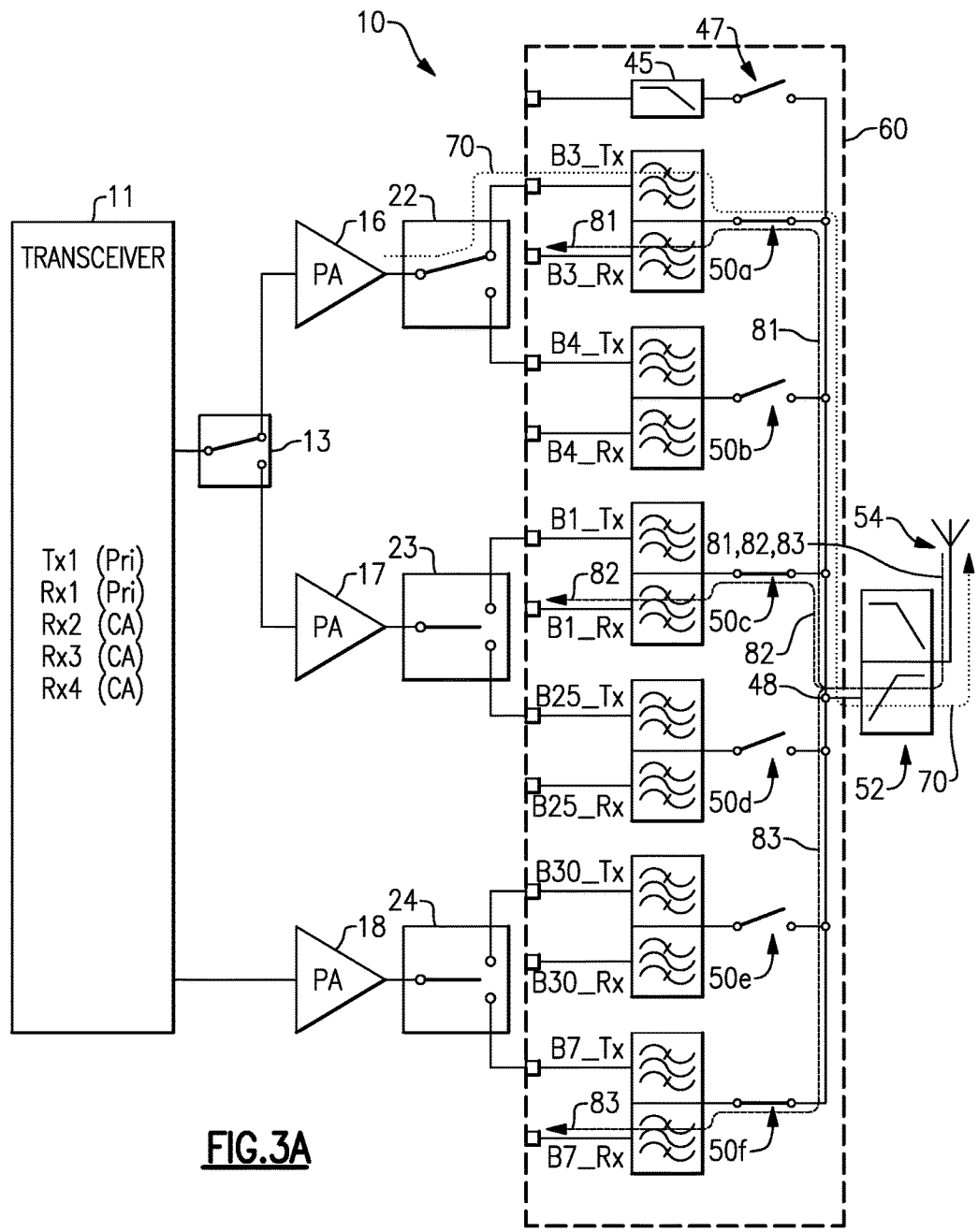
FIGS. 3A-3C show a more specific example of the front-end architecture of FIG. 2, where a group of three receive bands are carrier-aggregated.
Figure 3B:
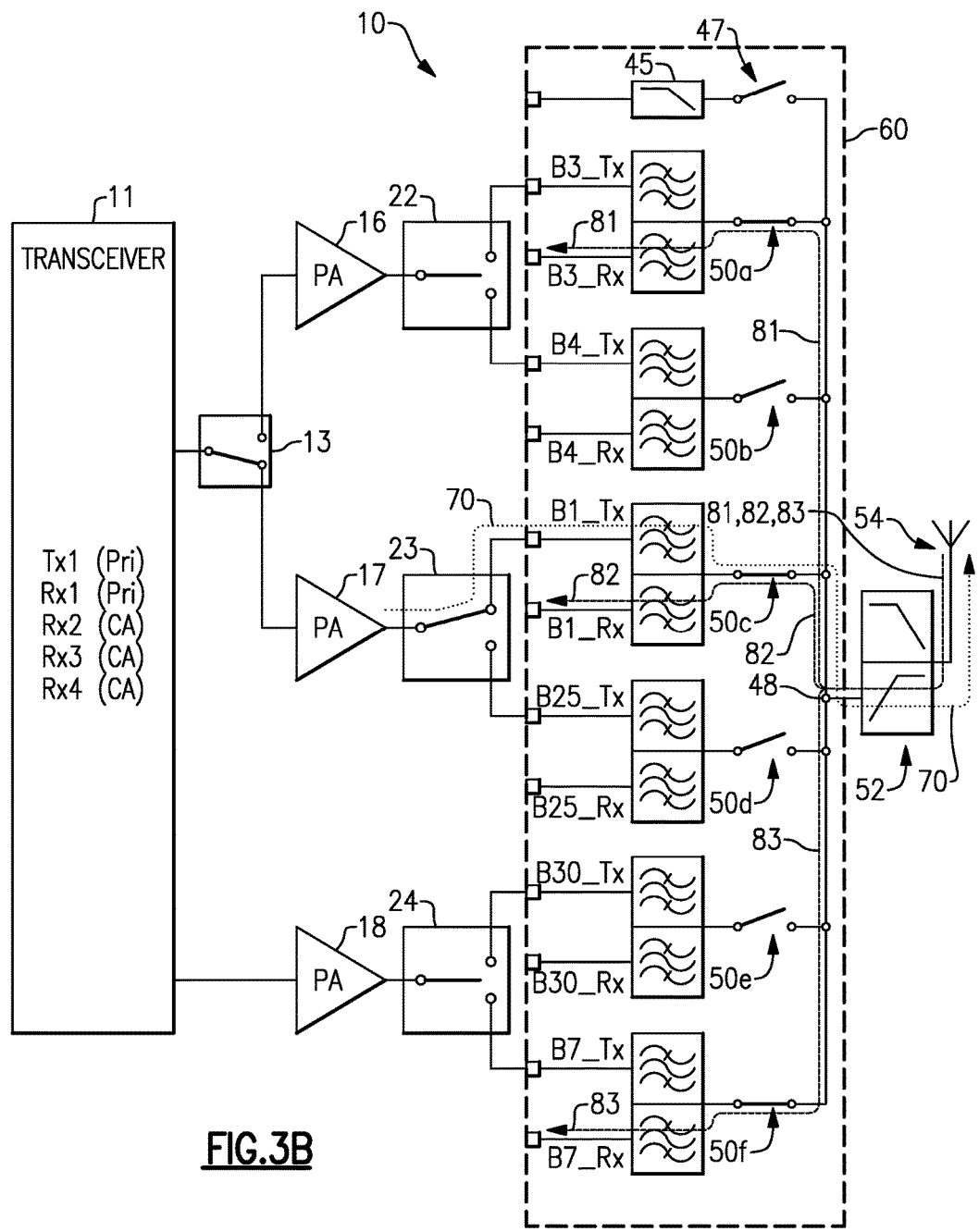
Figure 3C:
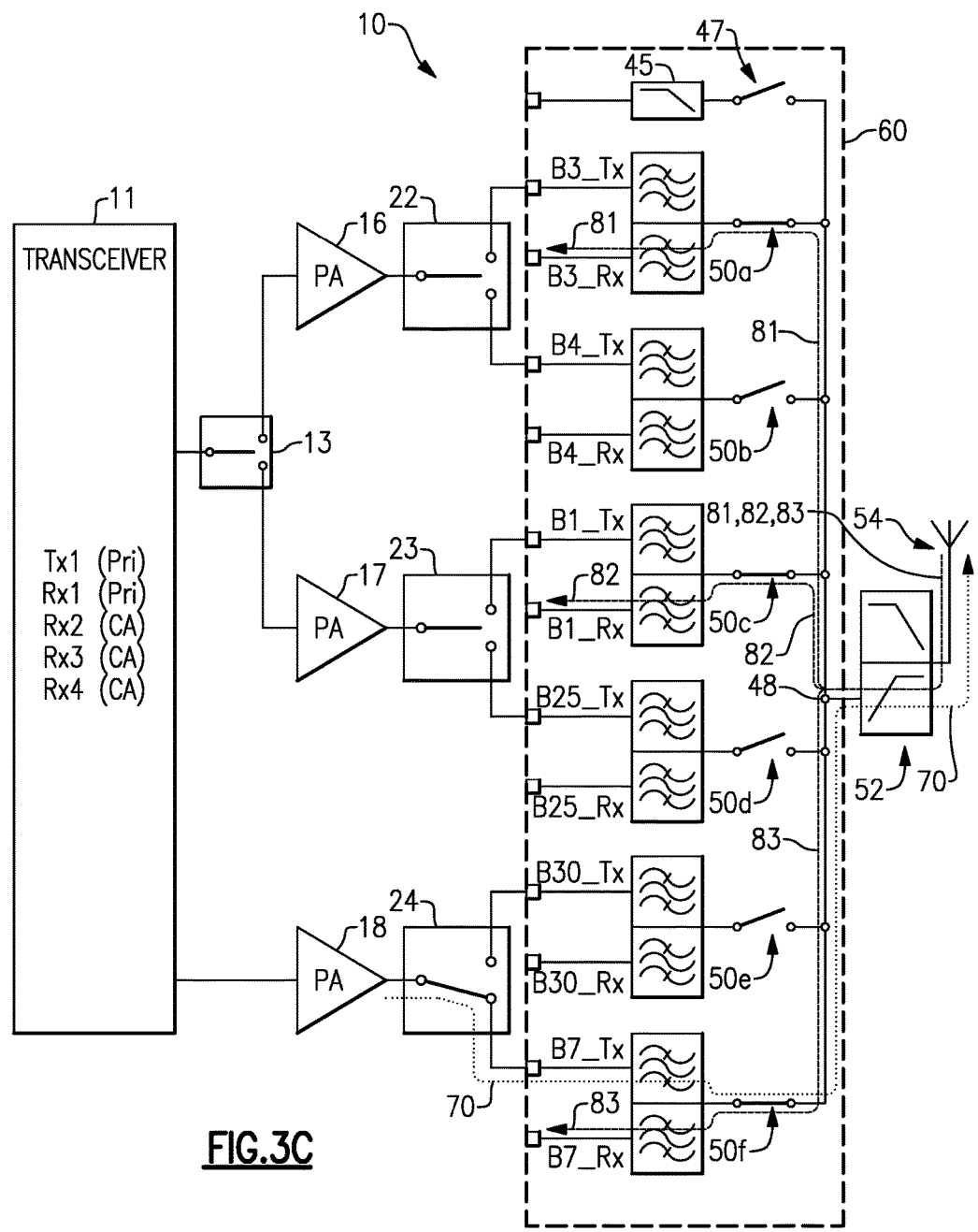

FIGS. 3A-3C show the front-end architecture 10 configured to operate with carrier-aggregation of three Rx bands B3, B1 and B7. FIG. 3A shows an example where a Tx operation is being performed with B3. Accordingly, for the purpose of description, the B3 band can be considered to be a primary band in the example configuration of FIG. 3A. FIG. 3B shows an example where a Tx operation is being performed with B1. Accordingly, for the purpose of description, the B1 band can be considered to be a primary band in the example configuration of FIG. 3B. FIG. 3C shows an example where a Tx operation is being performed with B7. Accordingly, for the purpose of description, the B7 band can be considered to be a primary band in the example configuration of FIG. 3C.

In each of the operating examples of FIGS. 3A-3C, a signal received by the antenna 54 is shown to be routed to the antenna node 48 in a signal path collectively indicated as 81, 82, 83. From the antenna node 48, the B3 portion of the received signal is shown to be provided to the corresponding Rx signal port as a first Rx signal path 81 through the antenna switch 50*a* (closed) and the Rx filter (B3_Rx) of the B3 duplexer. Similarly, from the antenna node 48, the B1 portion of the received signal is shown to be provided to the corresponding Rx signal port as a second Rx signal path 82 through the antenna switch 50*c* (closed) and the Rx filter (B1_Rx) of the B1 duplexer. Similarly, from the antenna node 48, the B7 portion of the received signal is shown to be provided to the corresponding Rx signal port as a third Rx signal path 83 through the antenna switch 50*f* (closed) and the Rx filter (B7_Rx) of the B7 duplexer. In each of the operating examples of FIGS. 3A-3C, the filtered Rx signals provided to the Rx signal ports can be processed further (e.g., amplified by one or more LNAs) and be routed to the transceiver 11. If such filtered Rx signals are being carrier-aggregated, they can be processed and routed to the transceiver 11 generally simultaneously.

In the operating example of FIG. 3A, the B3 Tx operation is shown to be achieved by the transceiver 11 providing a signal to the first power amplifier 16 through the selection switch 13. Such a signal is shown to be amplified by the first power amplifier 16 and be routed to the antenna port 48 in a signal path 70, through the switch 22, the Tx filter (B3_Tx) of the B3 duplexer, and the antenna switch 50*a* (closed). From the antenna port 48, the transmit signal path 70 is shown to continue to the antenna 54 to allow transmission of the amplified signal in the B3 Tx band.

In the operating example of FIG. 3B, the B1 Tx operation is shown to be achieved by the transceiver 11 providing a signal to the second power amplifier 17 through the selection switch 13. Such a signal is shown to be amplified by the second power amplifier 17 and be routed to the antenna port 48 in a signal path 70, through the switch 23, the Tx filter (B1_Tx) of the B1 duplexer, and the antenna switch 50*c* (closed). From the antenna port 48, the transmit signal path 70 is shown to continue to the antenna 54 to allow transmission of the amplified signal in the B1 Tx band.

In the operating example of FIG. 3C, the B7 Tx operation is shown to be achieved by the transceiver 11 providing a signal directly to the third power amplifier 18. Such a signal is shown to be amplified by the third power amplifier 18 and be routed to the antenna port 48 in a signal path 70, through the switch 24, the Tx filter (B7_Tx) of the B7 duplexer, and the antenna switch 50*f* (closed). From the antenna port 48, the transmit signal path 70 is shown to continue to the antenna 54 to allow transmission of the amplified signal in the B7 Tx band.

Figure 4A:
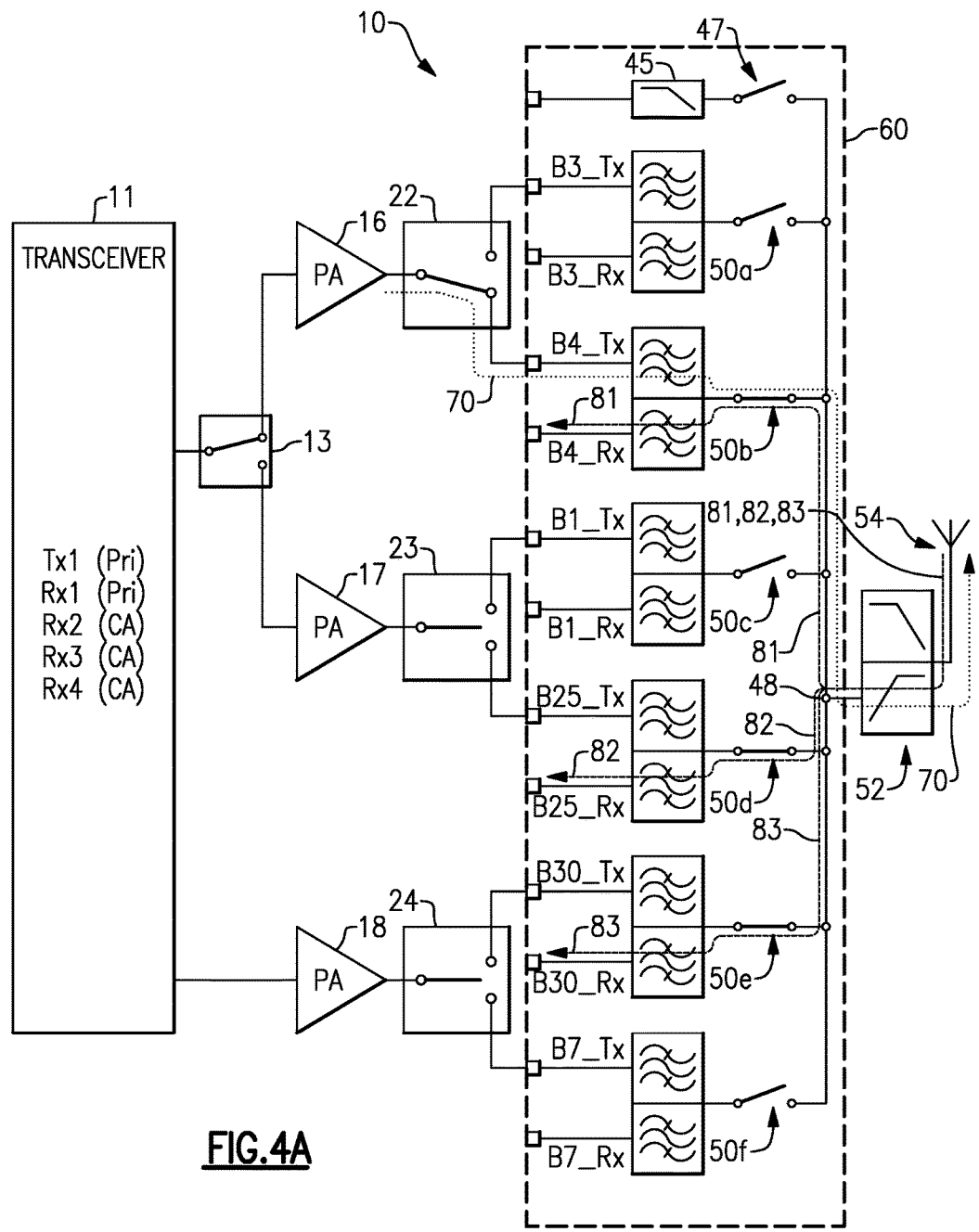
FIGS. 4A-4C also show a more specific example of the front-end architecture of FIG. 2, where another group of three receive bands are carrier-aggregated.
Figure 4B:
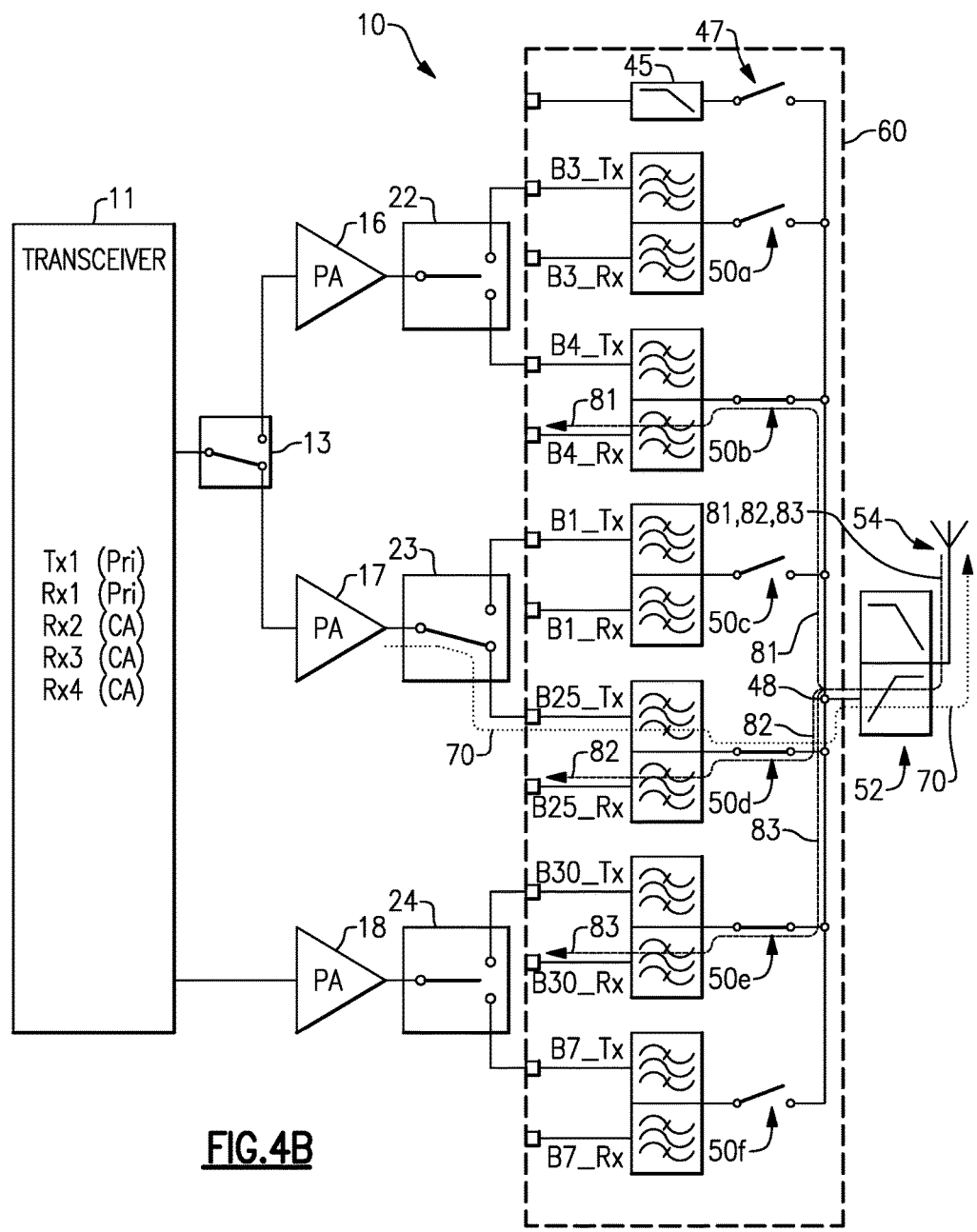
Figure 4C:
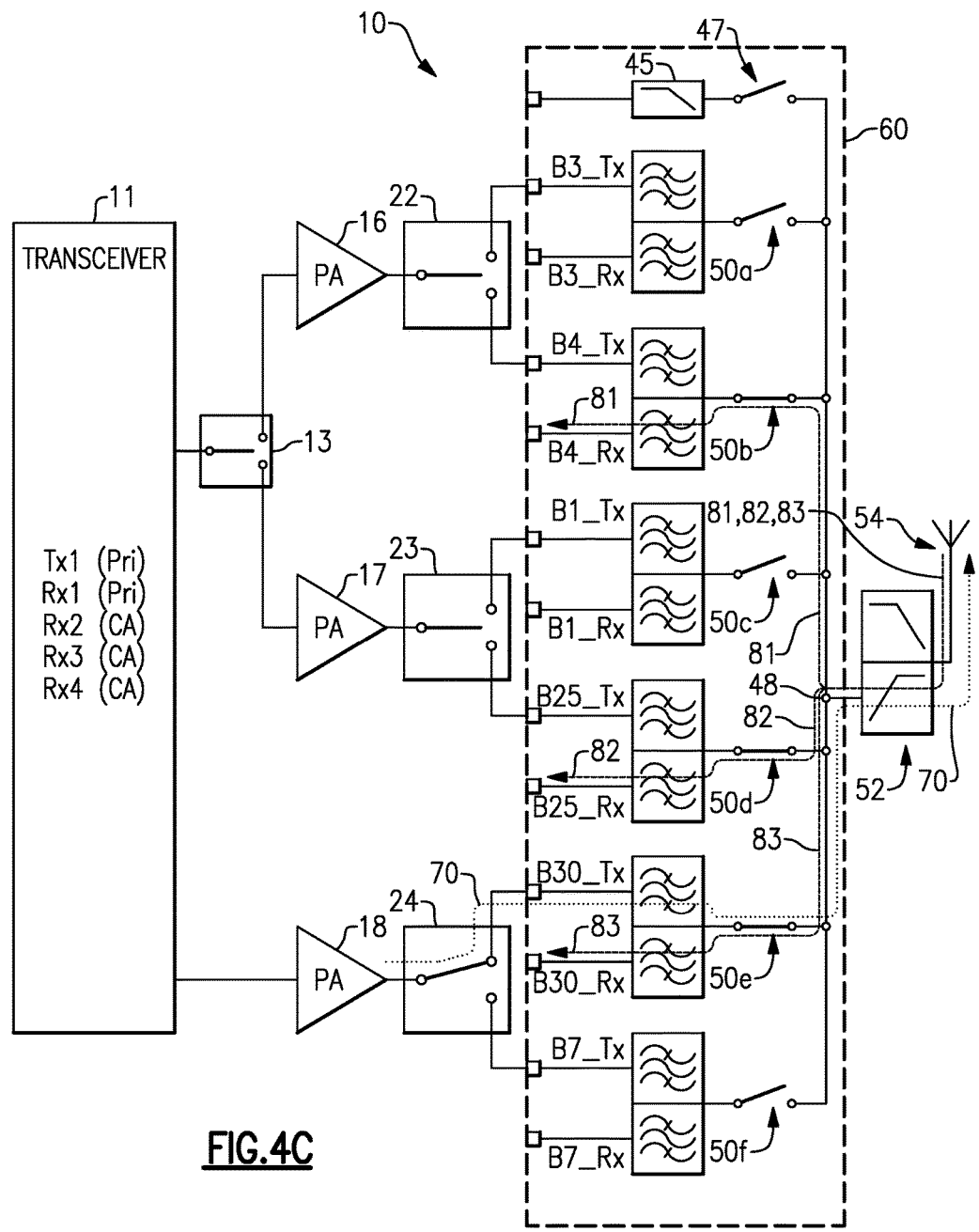

FIGS. 4A-4C show the front-end architecture 10 configured to operate with carrier-aggregation of three Rx bands B4, B25 and B30. FIG. 4A shows an example where a Tx operation is being performed with B4. Accordingly, for the purpose of description, the B4 band can be considered to be a primary band in the example configuration of FIG. 4A. FIG. 4B shows an example where a Tx operation is being performed with B25. Accordingly, for the purpose of description, the B25 band can be considered to be a primary band in the example configuration of FIG. 4B. FIG. 4C shows an example where a Tx operation is being performed with B30. Accordingly, for the purpose of description, the B30 band can be considered to be a primary band in the example configuration of FIG. 4C.

In each of the operating examples of FIGS. 4A-4C, a signal received by the antenna 54 is shown to be routed to the antenna node 48 in a signal path collectively indicated as 81, 82, 83. From the antenna node 48, the B4 portion of the received signal is shown to be provided to the corresponding Rx signal port as a first Rx signal path 81 through the antenna switch 50*b* (closed) and the Rx filter (B4_Rx) of the B4 duplexer. Similarly, from the antenna node 48, the B25 portion of the received signal is shown to be provided to the corresponding Rx signal port as a second Rx signal path 82 through the antenna switch 50*d* (closed) and the Rx filter (B25_Rx) of the B25 duplexer. Similarly, from the antenna node 48, the B30 portion of the received signal is shown to be provided to the corresponding Rx signal port as a third Rx signal path 83 through the antenna switch 50*e* (closed) and the Rx filter (B30_Rx) of the B30 duplexer. In each of the operating examples of FIGS. 4A-4C, the filtered Rx signals provided to the Rx signal ports can be processed further (e.g., amplified by one or more LNAs) and be routed to the transceiver 11. If such filtered Rx signals are being carrier-aggregated, they can be processed and routed to the transceiver 11 generally simultaneously.

In the operating example of FIG. 4A, the B4 Tx operation is shown to be achieved by the transceiver 11 providing a signal to the first power amplifier 16 through the selection switch 13. Such a signal is shown to be amplified by the first power amplifier 16 and be routed to the antenna port 48 in a signal path 70, through the switch 22, the Tx filter (B4_Tx) of the B4 duplexer, and the antenna switch 50*b* (closed). From the antenna port 48, the transmit signal path 70 is shown to continue to the antenna 54 to allow transmission of the amplified signal in the B4 Tx band.

In the operating example of FIG. 4B, the B25 Tx operation is shown to be achieved by the transceiver 11 providing a signal to the second power amplifier 17 through the selection switch 13. Such a signal is shown to be amplified by the second power amplifier 17 and be routed to the antenna port 48 in a signal path 70, through the switch 23, the Tx filter (B25_Tx) of the B25 duplexer, and the antenna switch 50*d* (closed). From the antenna port 48, the transmit signal path 70 is shown to continue to the antenna 54 to allow transmission of the amplified signal in the B25 Tx band.

In the operating example of FIG. 4C, the B30 Tx operation is shown to be achieved by the transceiver 11 providing a signal directly to the third power amplifier 18. Such a signal is shown to be amplified by the third power amplifier 18 and be routed to the antenna port 48 in a signal path 70, through the switch 24, the Tx filter (B30_Tx) of the B30 duplexer, and the antenna switch 50*e* (closed). From the antenna port 48, the transmit signal path 70 is shown to continue to the antenna 54 to allow transmission of the amplified signal in the B30 Tx band.

In the examples described herein in reference to FIGS. 3A-3C and 4A-4C, each transmit operation involves a post-PA switch (22, 23 or 24) a duplexer (B3, B4, B1, B25, B30 or B27), and an antenna switch (50*a*, 50*b*, 50*c*, 50*d*, 50*e* or 50*f*). Further, each receive operation involves an antenna switch (50*a*, 50*b*, 50*c*, 50*d*, 50*e* or 50*f*) and a duplexer (B3, B4, B1, B25, B30 or B27). Accordingly, in the example front-end architecture 10 of FIGS. 3A-3C and 4A-4C, a duplexer is needed for each cellular band, and a switch is needed at the output of each of the power amplifiers.

In some embodiments, a front-end architecture can be configured such that a single filter provides filtering functionalities for a plurality of frequency bands. For example, a single filter can be configured to provide Tx filtering functionalities for a plurality of Tx frequency bands. In another example, a single filter can be configured to provide Rx filtering functionalities for a plurality of Rx frequency bands.

When the foregoing single Tx filter and single Rx filter are implemented in the same front-end architecture, a number of features can be realized. For example, Tx and Rx operations of a band can be facilitated by the single Tx filter and the single Rx filter. In another example, Tx and Rx operations of a band can be by one of the single Tx filter and the single Rx filter, and another filter associated with, for example, a duplexer.

In the foregoing examples, two single filters (one single Tx filter and one single Rx filter) can replace two duplexers in a front-end system such as in the examples of FIGS. 2-4, thereby reducing the cost and area associated with one duplexer (e.g., surface-acoustic-wave (SAW) or bulk-acoustic-wave (BAW) filter based duplexers). It is also noted that in the foregoing examples, use of the two single filters can allow removal of a post-PA switch, thereby reducing loss and consequently increasing efficiency of associated transmit path(s). Examples related to the foregoing are described herein in greater detail.

Figure 5:
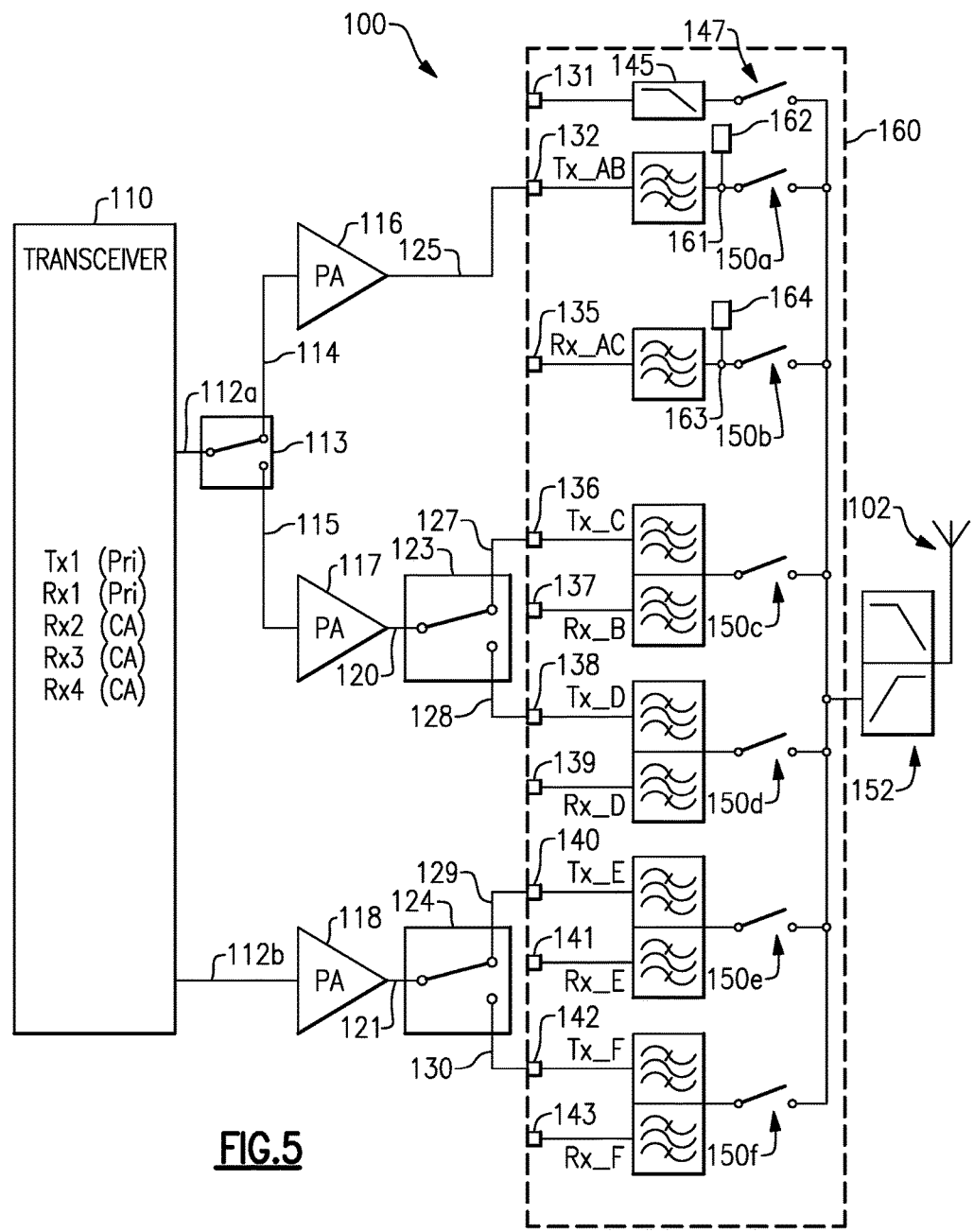
FIG. 5 shows a front-end architecture that can be a more specific example of the front-end architecture of FIG. 1.

FIG. 5 shows a front-end architecture 100 that can be a more specific example of the front-end architecture 100 of FIG. 1. In the example of FIG. 5 the front-end architecture 100 is shown to be capable of handling six generic bands (A-F) similar to the example of FIG. 2. Although described in such an example context, it will be understood that one or more features of the present disclosure can also be implemented with different numbers of bands.

In some embodiments, each of the six bands (A-F) in FIG. 5 can be a mid-band (MB), a high-band (HB), or some combination thereof. However, it will be understood that one or more features of the present disclosure can also be implemented in other frequency bands.

In the example of FIG. 5, the example front-end architecture 100 can be in communication with, or include, a transceiver 110. Such a transceiver is shown to include, for example, FDD transmit (Tx) and receive (Rx) capability for a primary band. Accordingly, such FDD Tx and Rx bands are indicated as Tx1 and Rx1, respectively.

The transceiver 110 in FIG. 5 is also shown to include, for example, carrier-aggregation (CA) functionality involving three Rx bands (Rx2, Rx3, Rx4). Such Rx bands involved in carrier-aggregation may or may not include the foregoing receive portion (Rx1) of the primary band. It will be understood that, although various examples are described with carrier-aggregation with such three Rx bands, one or more features of the present disclosure can also be implemented with different numbers of Rx bands being carrier-aggregated.

In FIG. 5, the example front-end architecture 100 is shown to include, or be in communication with, three power amplifiers (PAs) 116, 117, 118. Each power amplifier is shown to be coupled to the transceiver 110 directly or through a selection switch. For example, an input of the first power amplifier 116 is shown to be coupled to the transceiver 110 through a signal path 112a, a selector switch 113, and a signal path 114. Similarly, an input of the second power amplifier 117 is shown to be coupled to the transceiver 110 through the signal path 112a, the selector switch 113, and a signal path 115. An input of the third power amplifier 118, however, is shown to be coupled directly to the transceiver 110 through a signal path 112b.

In FIG. 5, an output of each power amplifier (116, 117 or 118) is shown to be coupled to a single filter without a post-PA filter or be capable of being coupled to two duplexers through a respective selector switch. More particularly, an output of the first power amplifier 116 is shown to be coupled to a single Tx filter (Tx_AB) through a signal path 125 and a signal port 132. It is noted that in such a PA-to-filter path, a switch can be absent.

Referring to FIG. 5, an output of the second power amplifier 117 is shown to be coupled to a pole of a selector switch 123 through a signal path 120. A first throw of the selector switch 123 is shown to be coupled to a Tx filter (Tx_C) of a duplexer (CB) through a signal path 127 and a signal port 136. Similarly, a second throw of the switch 123 is shown to be coupled to a Tx filter (Tx_D) of a duplexer (D) through a signal path 128 and a signal port 138.

Referring to FIG. 5, an output of the third power amplifier 118 is shown to be coupled to a pole of a selector switch 124 through a signal path 121. A first throw of the selector switch 124 is shown to be coupled to a Tx filter (Tx_E) of a duplexer (E) through a signal path 129 and a signal port 140. Similarly, a second throw of the switch 124 is shown to be coupled to a Tx filter (Tx_F) of a duplexer (F) through a signal path 130 and a signal port 142.

In FIG. 5, each of the four duplexers (CB, D, E, F) is shown to include an Rx filter. More particularly, the duplexer (CB) is shown to include an Rx filter (Rx_B) having an output coupled to a signal port 137. The transmit and receive filters Tx_C, Rx_B of the duplexer (CB) can be configured to provide FDD functionality as described herein.

Referring to FIG. 5, the duplexer (D) is shown to include an Rx filter (Rx_D) having an output coupled to a signal port 139. The transmit and receive filters Tx_D, Rx_D of the duplexer (D) are configured to provide FDD functionality associated with Tx and Rx frequency ranges of the generic D band.

Referring to FIG. 5, the duplexer (E) is shown to include an Rx filter (Rx_E) having an output coupled to a signal port 141. The transmit and receive filters Tx_E, Rx_E of the duplexer (E) are configured to provide FDD functionality associated with Tx and Rx frequency ranges of the generic E band.

Referring to FIG. 5, the duplexer (F) is shown to include an Rx filter (Rx_F) having an output coupled to a signal port 143. The transmit and receive filters Tx_F, Rx_F of the duplexer (F) are configured to provide FDD functionality associated with Tx and Rx frequency ranges of the generic F band.

In the example of FIG. 5, the front-end architecture 100 is shown to include a single Rx filter (Rx_AC) having an output coupled to a signal port 135. Rx operations involving such a single Rx filter are described herein in greater detail.

In the example of FIG. 5, each of the Rx signal ports 135, 137, 139, 141, 143 can be in communication with the transceiver 110 through an Rx signal path (not shown in FIG. 5). Such an Rx signal path can include, for example, a low-noise amplifier (LNA). In some embodiments, one LNA can service one or more Rx signal paths.

In the example of FIG. 5, each of the single Tx filter (Tx_AB), the single Rx filter (Rx_AC), and the duplexers (CB, D, E, F) is shown to be capable of being coupled to an antenna 102 through an antenna switch, an antenna port 148, and an antenna filter 152. More particularly, the single Tx filter Tx_AB can be coupled to the antenna 102 through an antenna switch 150a, and the single Rx filter Rx_AC can be coupled to the antenna 102 through an antenna switch 150b. A duplexer (CB) can be coupled to the antenna 102 through an antenna switch 150c; the duplexer (D) can be coupled to the antenna 102 through an antenna switch 150d; the duplexer (E) can be coupled to the antenna 102 through an antenna switch 150e; and the duplexer (F) can be coupled to the antenna 102 through an antenna switch 150f.

In the example of FIG. 5, the six examples bands (A-F) can be mid-band (MB), high-band (HB), or some combination thereof. Thus, the antenna port 148 is shown to be coupled to the antenna 102 through a high-pass portion of the antenna filter 152. Although various examples are described herein in the context of MB/HB settings, it will be understood that one or more features of the present disclosure can also be implemented with one or more low-bands (LBs).

In some embodiments, an assembly of filters and antenna switches generally included in a box 160 can be implemented in an antenna switch filter module. In some embodiments, such an antenna switch filter module can also include one or more LB signal paths. For example, a low-pass filter 145 is shown to be implemented between a signal port 131 and an antenna switch 147. In some embodiments, such an antenna switch can be coupled to the antenna 102 through a low-band portion of the antenna filter 152.

In some embodiments, the front-end architecture 100 of FIG. 5 can include an impedance matching circuit for each of the single Tx filter Tx_AB and the single Rx filter Tx_AC. A node 161 at the output of the single Tx filter Tx_AB is shown to be coupled to an impedance matching circuit 162, and a node 163 at the input of the single Rx filter Rx_AC is shown to be coupled to an impedance matching circuit 164.

Figure 6:
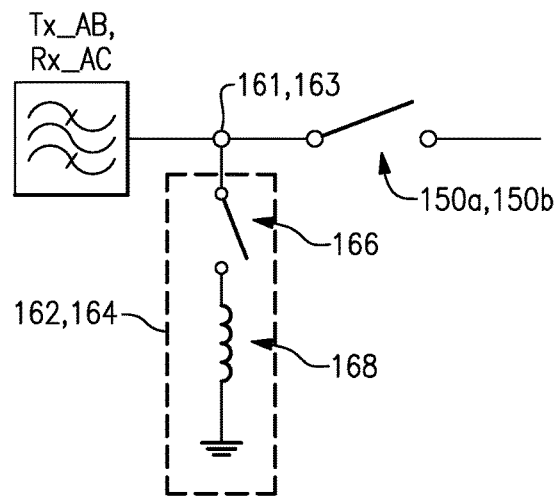
FIG. 6 shows an example of an impedance matching circuit that can be utilized in the front-end architecture of FIG. 5.

FIG. 6 shows an example of an impedance matching circuit that can be utilized for each of the impedance matching circuits 162, 164. Such an impedance matching circuit can include an inductance 168 that switchably couples the node (161 or 163) to ground. Such a switchable coupling can be achieved by, for example, a shunt switch 166. The inductance 168 can have a value selected to facilitate the bands of the corresponding single filter, and to facilitate rejection of out-of-band frequency ranges during various carrier-aggregation operations.

Figure 7:
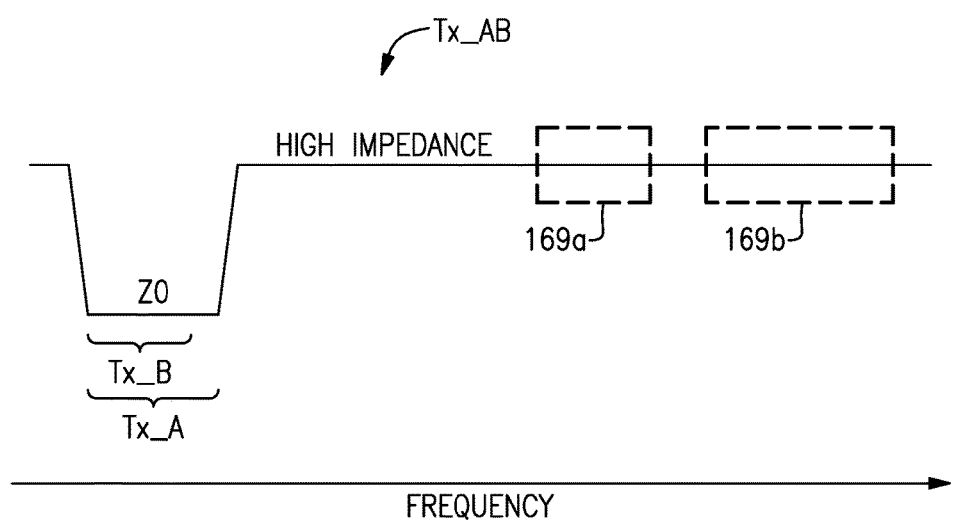
FIG. 7 shows an example of how a single transmit filter in the front-end architecture of FIG. 5 can be configured to provide a desired impedance profile.

FIG. 7 shows that in some embodiments, the single Tx filter TX_AB can be configured to provide a desired impedance profile. In some embodiments, such an impedance profile can include a pass band having a desirable impedance Z0 (e.g., approximately 50 ohms), and out-of-band regions having high impedances. The example pass band can cover both of the generic Tx bands Tx_A and Tx_B.

In the example of FIG. 7, the impedance profile of the single Tx filter TX_AB can include an appropriately high impedance regions for one or more bands involved in carrier-aggregation operation(s) with the single Tx filter TX_AB. For example, frequency regions indicated as 169a and 169b can correspond to such high impedance bands involved in carrier-aggregation operations. In some embodiments, such appropriately high impedance regions can be achieved or facilitated by the impedance matching circuit 162.

FIGS. 8A-8C and 9A-9C show a more specific example of the front-end architecture 100 of FIG. 5. In each of FIGS. 8A-8C and 9A-9C, a front-end architecture 100 is configured such that the generic six bands of FIG. 5 are implemented as example cellular frequency bands as listed in Table 2. Such example cellular frequency bands are the same as in Table 1 and FIGS. 3A-3C and 4A-4C for comparison purposes. It will be understood that one or more features of the present disclosure can also be implemented utilizing other cellular frequency bands.

TABLE 2

| Band (FIG. 5) | Band (FIGS. 8, 9) | Tx Freq. Range (MHz) | Rx Freq. Range (MHz) |
|---|---|---|---|
| A | B3 | 1,710-1,785 | 1,805-1,880 |
| B | B4 | 1,710-1,755 | 2,110-2,155 |

TABLE 2-continued

| Band (FIG. 5) | Band (FIGS. 8, 9) | Tx Freq. Range (MHz) | Rx Freq. Range (MHz) |
|---|---|---|---|
| C | B1 | 1,920-1,980 | 2,110-2,170 |
| D | B25 | 1,850-1,915 | 1,930-1,995 |
| E | B30 | 2,305-2,315 | 2,350-2,360 |
| F | B7 | 2,500-2,570 | 2,620-2,690 |

Figure 8A:
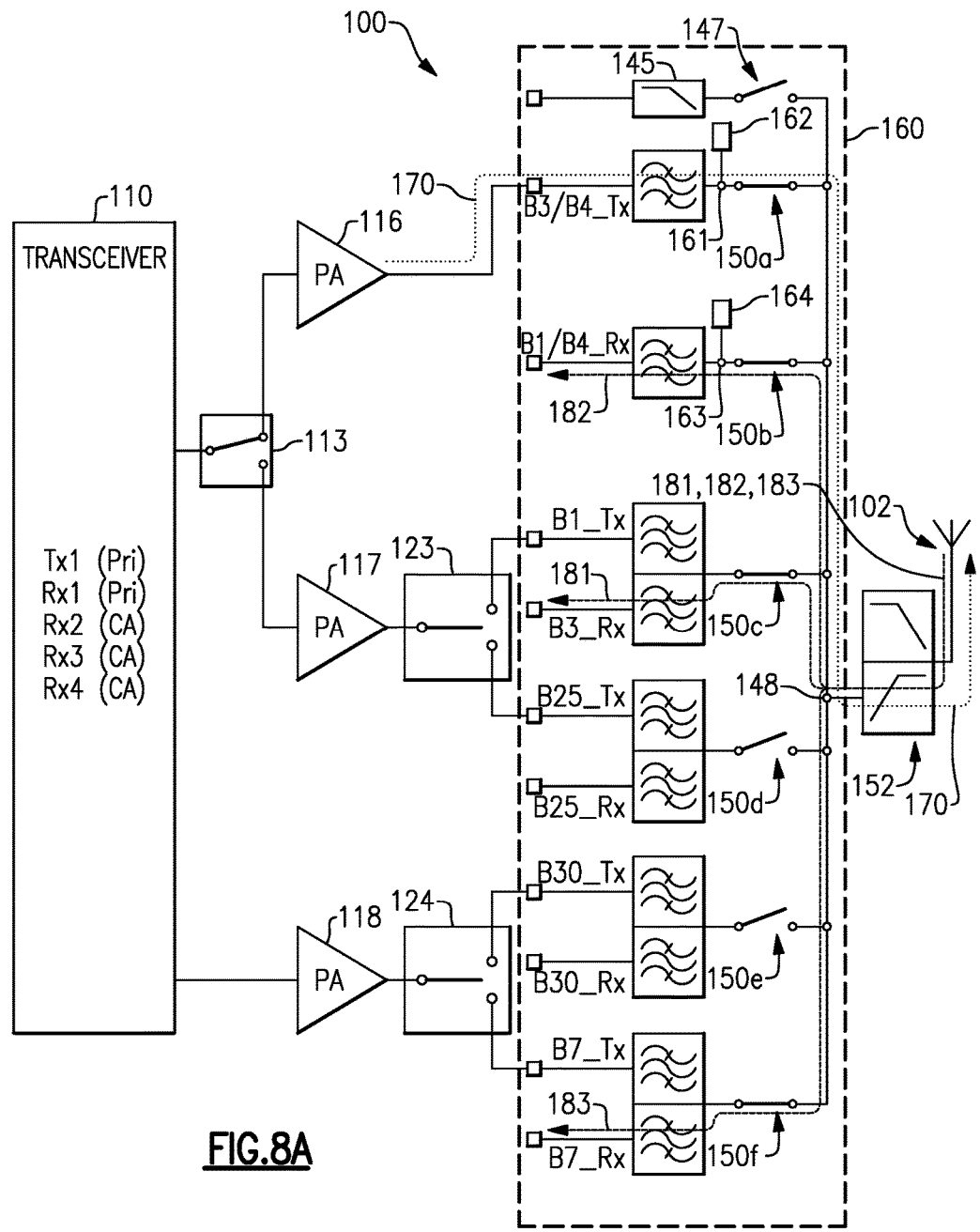
FIGS. 8A-8C show a more specific example of the front-end architecture of FIG. 5, where a group of three receive bands are carrier-aggregated.
Figure 8B:
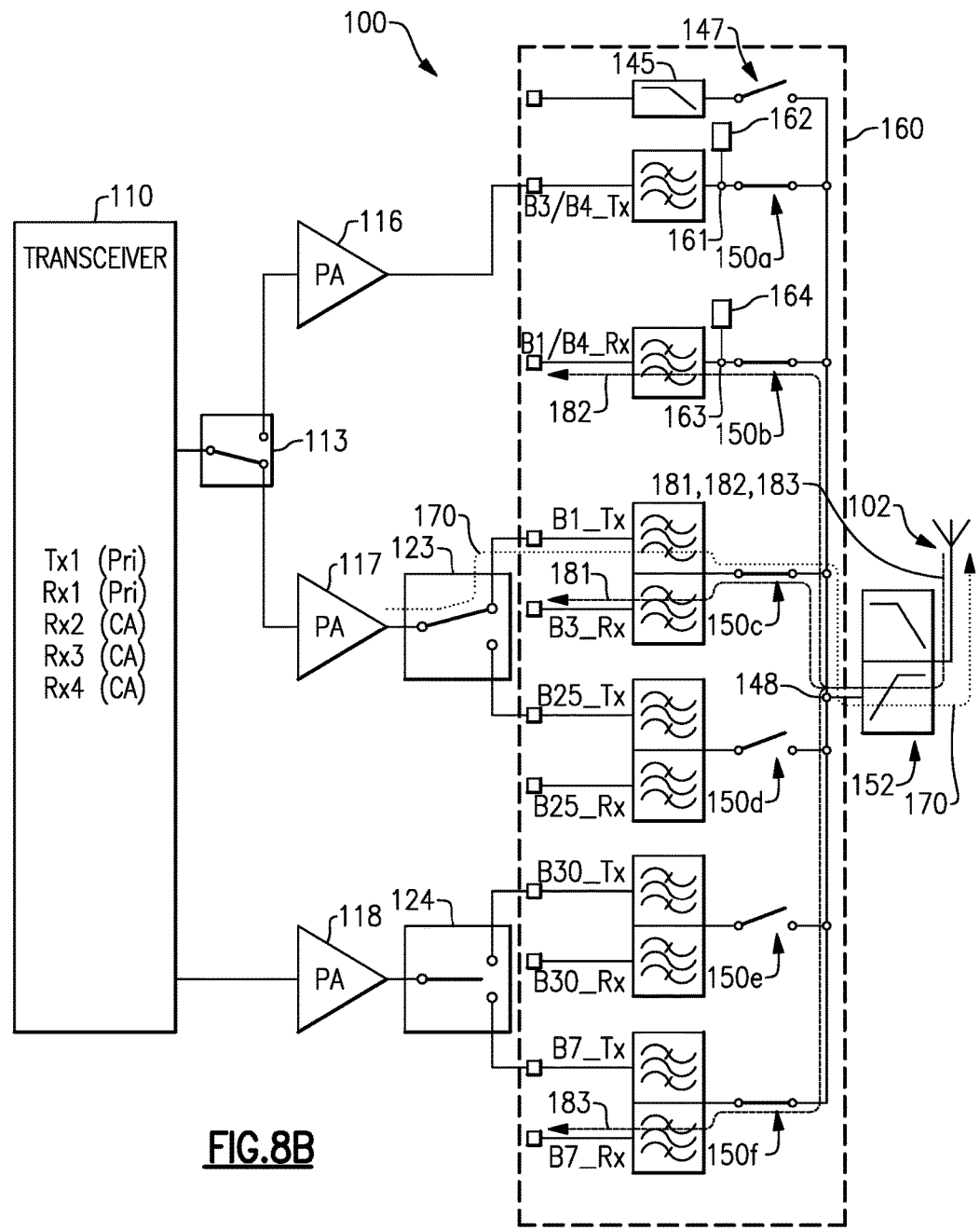
Figure 8C:
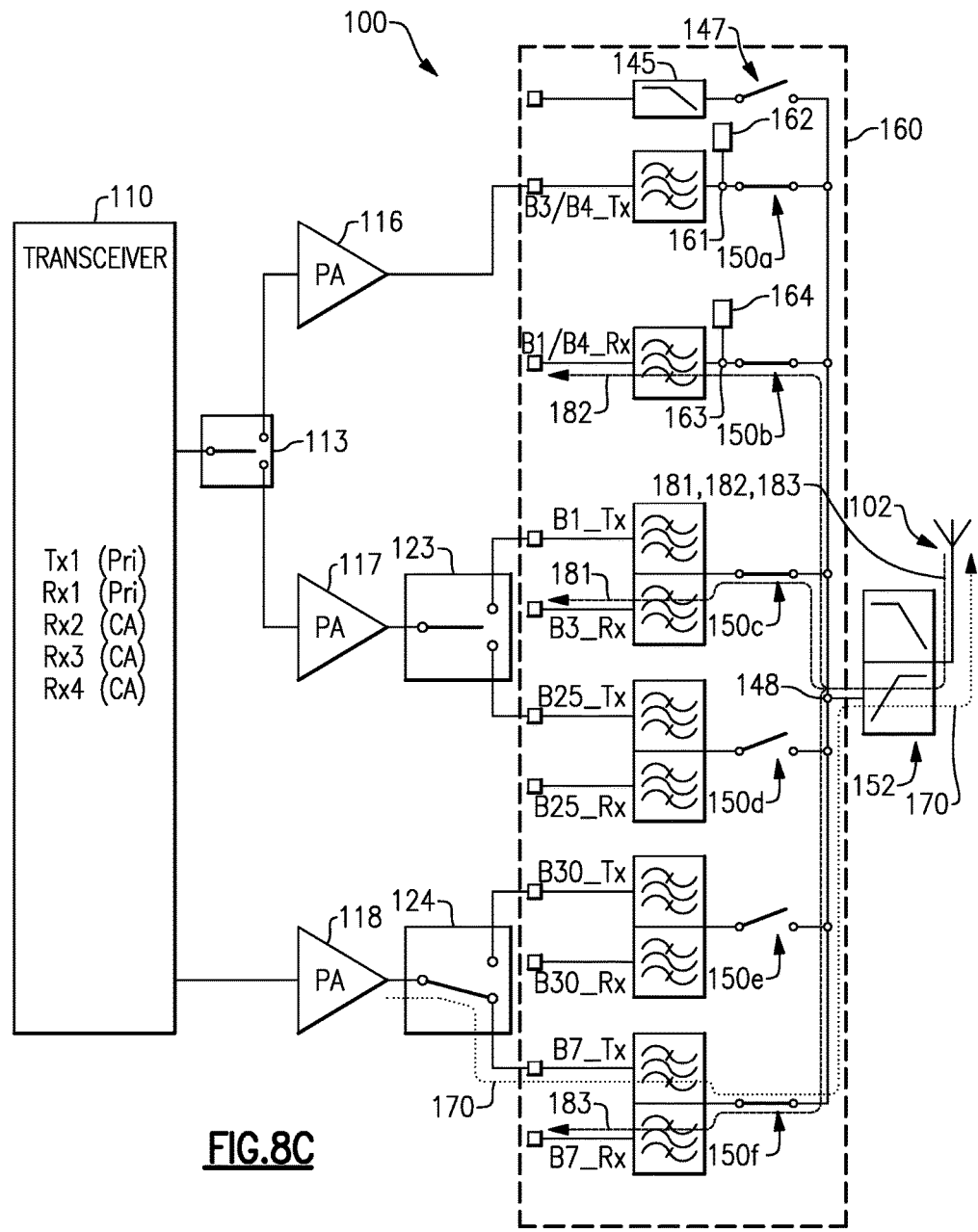

FIGS. 8A-8C show the front-end architecture 100 configured to operate with carrier-aggregation of three Rx bands B3, B1 and B7. FIG. 8A shows an example where a Tx operation is being performed with B3. Accordingly, for the purpose of description, the B3 band can be considered to be a primary band in the example configuration of FIG. 8A. FIG. 8B shows an example where a Tx operation is being performed with B1. Accordingly, for the purpose of description, the B1 band can be considered to be a primary band in the example configuration of FIG. 8B. FIG. 8C shows an example where a Tx operation is being performed with B7. Accordingly, for the purpose of description, the B7 band can be considered to be a primary band in the example configuration of FIG. 8C.

In each of the operating examples of FIGS. 8A-8C, a signal received by the antenna 102 is shown to be routed to the antenna node 148 in a signal path collectively indicated as 181, 182, 183. From the antenna node 148, the B3 portion of the received signal is shown to be provided to the corresponding Rx signal port as a first Rx signal path 181 through the antenna switch 150c (closed) and the Rx filter (B3_Rx) of the B1_Tx/B3_Rx duplexer. Similarly, from the antenna node 148, the B1 portion of the received signal is shown to be provided to the corresponding Rx signal port as a second Rx signal path 182 through the antenna switch 150b (closed) and the single Rx filter (B1/B4_Rx). Similarly, from the antenna node 148, the B7 portion of the received signal is shown to be provided to the corresponding Rx signal port as a third Rx signal path 183 through the antenna switch 150f (closed) and the Rx filter (B7_Rx) of the B7 duplexer. In each of the operating examples of FIGS. 8A-8C, the filtered Rx signals provided to the Rx signal ports can be processed further (e.g., amplified by one or more LNAs) and be routed to the transceiver 110. If such filtered Rx signals are being carrier-aggregated, they can be processed and routed to the transceiver 110 generally simultaneously.

In the operating example of FIG. 8A, the B3 Tx operation is shown to be achieved by the transceiver 110 providing a signal to the first power amplifier 116 through the selection switch 113. Such a signal is shown to be amplified by the first power amplifier 116 and be routed to the antenna port 148 in a signal path 170, through the single Tx filter (B3/B4_Tx), and the antenna switch 150a (closed). From the antenna port 148, the transmit signal path 170 is shown to continue to the antenna 102 to allow transmission of the amplified signal in the B3 Tx band.

In the example of FIG. 8A, it is noted that a portion of the signal path 170 between the first power amplifier 116 and the single Tx filter (B3/B4_Tx) is substantially free of a post-PA switch (e.g., 22 in FIGS. 2-4). As described herein, such an absence of a post-PA switch can be desirable (e.g., to reduce loss in Tx signal), and can be facilitated by an appropriately configured single Tx filter configured to operate in a plurality of frequency bands.

In the operating example of FIG. 8B, the B1 Tx operation is shown to be achieved by the transceiver 110 providing a signal to the second power amplifier 117 through the selection switch 113. Such a signal is shown to be amplified by the second power amplifier 117 and be routed to the antenna port 148 in a signal path 170, through the switch 123, the Tx filter (B1_Tx) of the B1_Tx/B3_RX duplexer, and the antenna switch 150c (closed). From the antenna port 148, the transmit signal path 170 is shown to continue to the antenna 102 to allow transmission of the amplified signal in the B1 Tx band.

In the operating example of FIG. 8C, the B7 Tx operation is shown to be achieved by the transceiver 110 providing a signal directly to the third power amplifier 118. Such a signal is shown to be amplified by the third power amplifier 118 and be routed to the antenna port 148 in a signal path 170, through the switch 124, the Tx filter (B7_Tx) of the B7 duplexer, and the antenna switch 150f (closed). From the antenna port 148, the transmit signal path 170 is shown to continue to the antenna 102 to allow transmission of the amplified signal in the B7 Tx band.

Figure 9A:
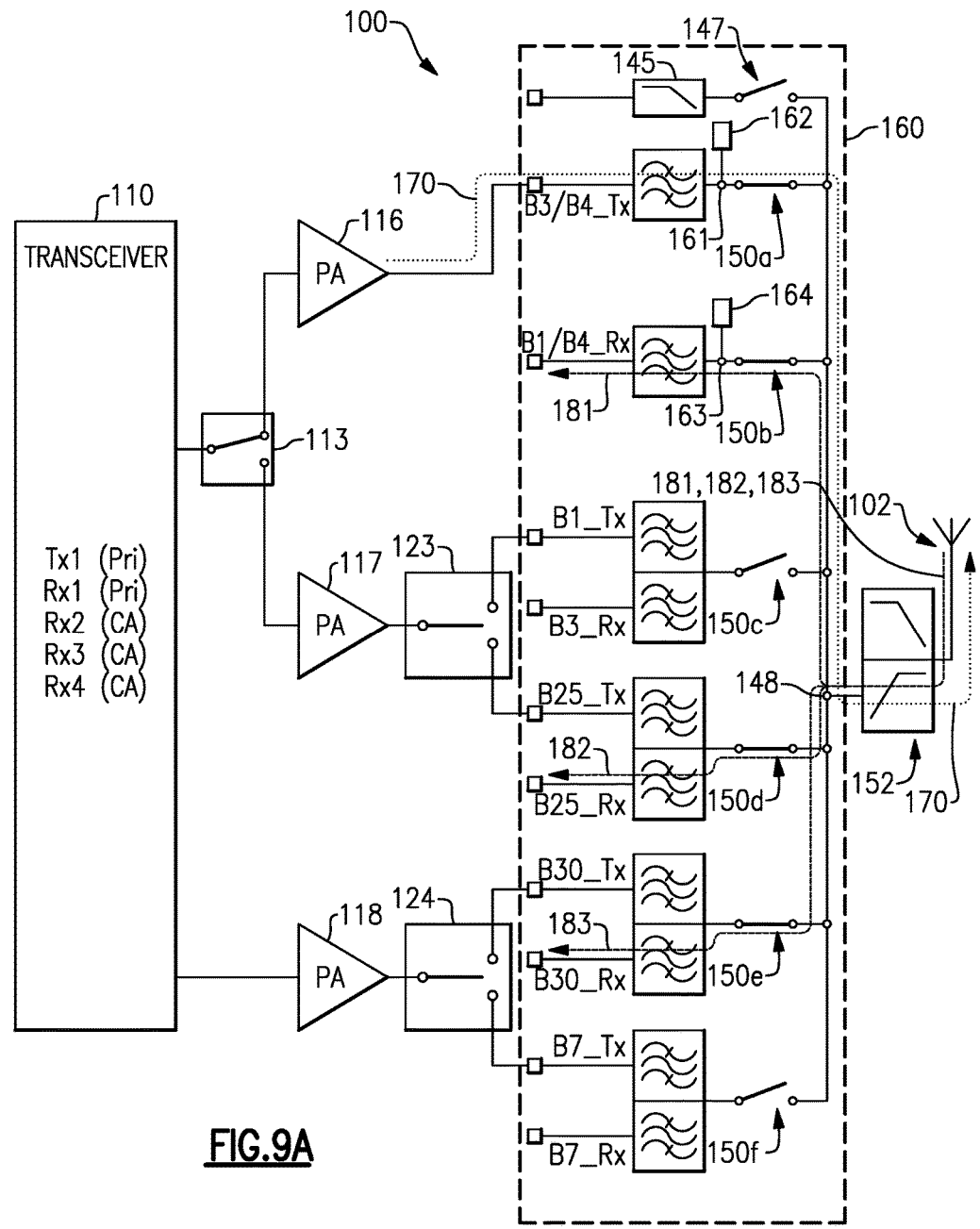
FIGS. 9A-9C also show a more specific example of the front-end architecture of FIG. 5, where another group of three receive bands are carrier-aggregated.
Figure 9B:
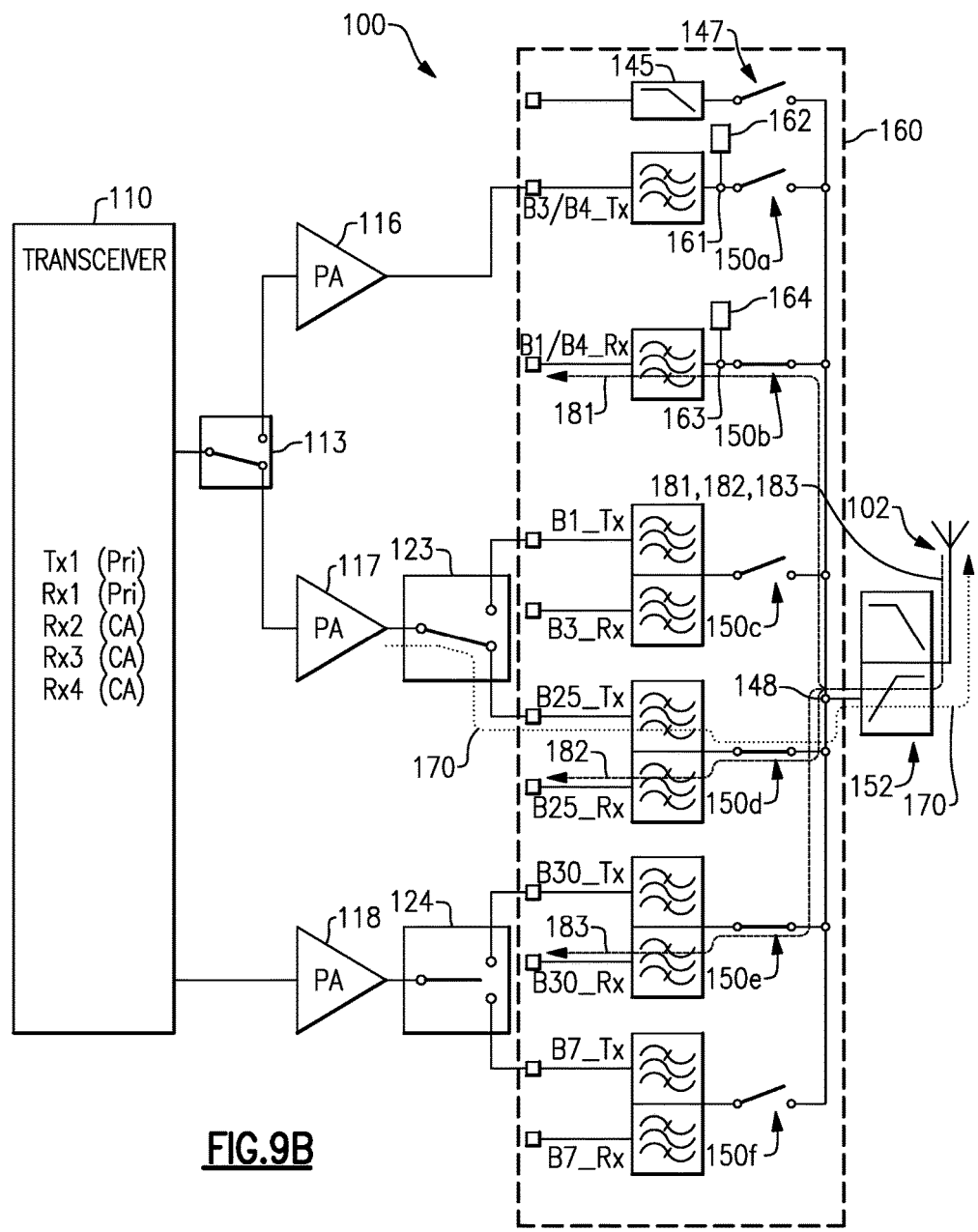
Figure 9C:
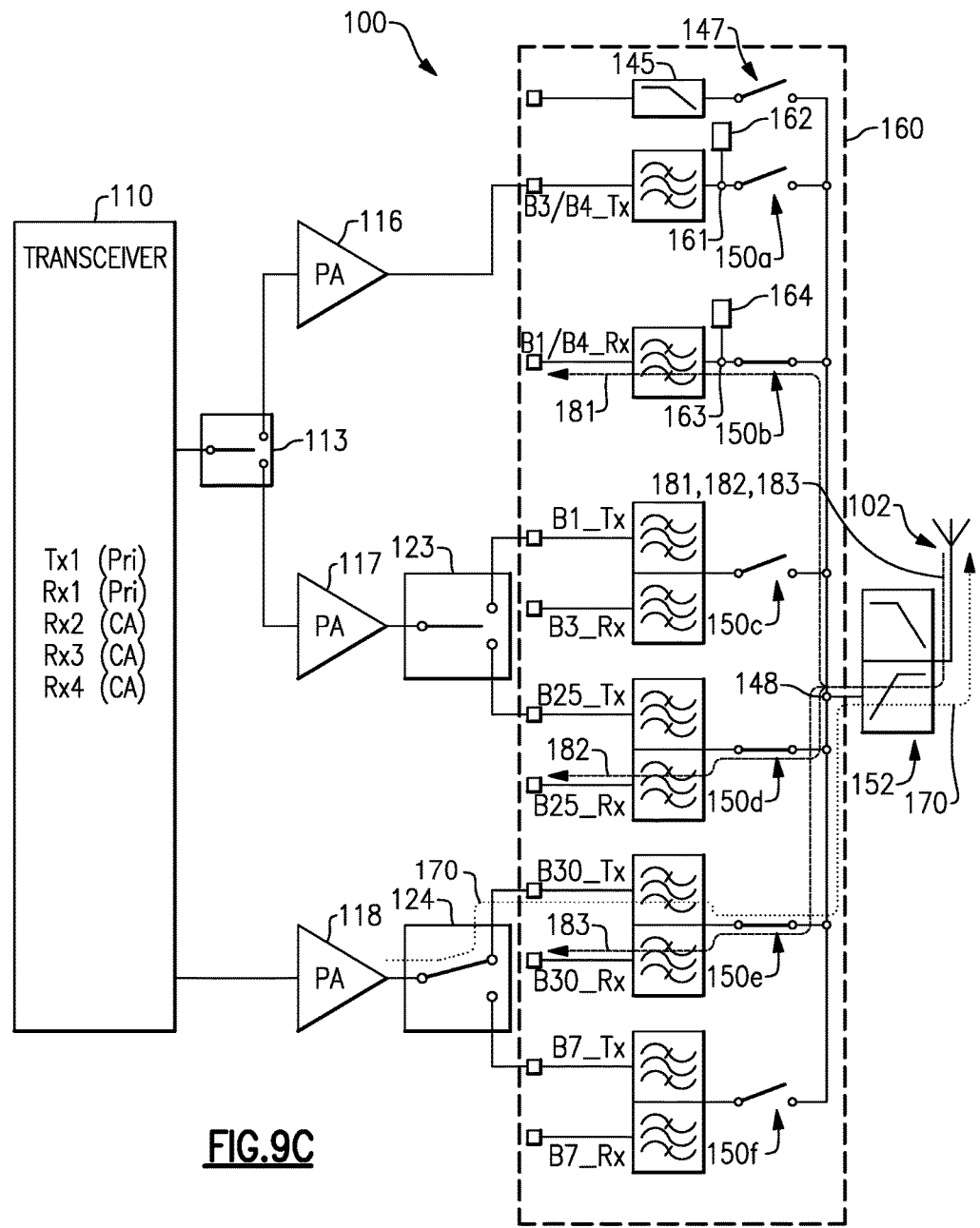

FIGS. 9A-9C show the front-end architecture 100 configured to operate with carrier-aggregation of three Rx bands B4, B25 and B30. FIG. 9A shows an example where a Tx operation is being performed with B4. Accordingly, for the purpose of description, the B4 band can be considered to be a primary band in the example configuration of FIG. 9A. FIG. 9B shows an example where a Tx operation is being performed with B25. Accordingly, for the purpose of description, the B25 band can be considered to be a primary band in the example configuration of FIG. 9B. FIG. 9C shows an example where a Tx operation is being performed with B30. Accordingly, for the purpose of description, the B30 band can be considered to be a primary band in the example configuration of FIG. 9C.

In each of the operating examples of FIGS. 9A-9C, a signal received by the antenna 102 is shown to be routed to the antenna node 148 in a signal path collectively indicated as 181, 182, 183. From the antenna node 148, the B4 portion of the received signal is shown to be provided to the corresponding Rx signal port as a first Rx signal path 181 through the antenna switch 150b (closed) and the single Rx filter (B1/B4_Rx). Similarly, from the antenna node 148, the B25 portion of the received signal is shown to be provided to the corresponding Rx signal port as a second Rx signal path 182 through the antenna switch 150d (closed) and the Rx filter (B25_Rx) of the B25 duplexer. Similarly, from the antenna node 148, the B30 portion of the received signal is shown to be provided to the corresponding Rx signal port as a third Rx signal path 183 through the antenna switch 150e (closed) and the Rx filter (B30_Rx) of the B30 duplexer. In each of the operating examples of FIGS. 9A-9C, the filtered Rx signals provided to the Rx signal ports can be processed further (e.g., amplified by one or more LNAs) and be routed to the transceiver 110. If such filtered Rx signals are being carrier-aggregated, they can be processed and routed to the transceiver 110 generally simultaneously.

In the operating example of FIG. 9A, the B4 Tx operation is shown to be achieved by the transceiver 110 providing a signal to the first power amplifier 116 through the selection switch 113. Such a signal is shown to be amplified by the first power amplifier 116 and be routed to the antenna port 148 in a signal path 170, through the single Tx filter (B3/B4_Tx), and the antenna switch 150a (closed). From the antenna port 148, the transmit signal path 170 is shown to continue to the antenna 102 to allow transmission of the amplified signal in the B4 Tx band.

In the example of FIG. 9A, it is noted that a portion of the signal path 170 between the first power amplifier 116 and the single Tx filter (B3/B4_Tx) is substantially free of a post-PA switch (e.g., 22 in FIGS. 2-4). As described herein, such an absence of a post-PA switch can be desirable (e.g., to reduce loss in Tx signal), and can be facilitated by an appropriately configured single Tx filter configured to operate in a plurality of frequency bands.

Referring to the examples of FIG. 8A and FIG. 9A, it is noted that the single Tx filter (B3/B4_Tx) can allow Tx operations to be carried out for the two associated bands (B3 Tx and B4 Tx) without a post-PA switch.

In the operating example of FIG. 9B, the B25 Tx operation is shown to be achieved by the transceiver 110 providing a signal to the second power amplifier 117 through the selection switch 113. Such a signal is shown to be amplified by the second power amplifier 117 and be routed to the antenna port 148 in a signal path 170, through the switch 123, the Tx filter (B25_Tx) of the B25 duplexer, and the antenna switch 150d (closed). From the antenna port 148, the transmit signal path 170 is shown to continue to the antenna 102 to allow transmission of the amplified signal in the B25 Tx band.

In the operating example of FIG. 9C, the B30 Tx operation is shown to be achieved by the transceiver 110 providing a signal directly to the third power amplifier 118. Such a signal is shown to be amplified by the third power amplifier 118 and be routed to the antenna port 148 in a signal path 170, through the switch 124, the Tx filter (B30_Tx) of the B30 duplexer, and the antenna switch 150e (closed). From the antenna port 148, the transmit signal path 170 is shown to continue to the antenna 102 to allow transmission of the amplified signal in the B30 Tx band.

As described herein in reference to FIG. 7, the single Tx filter Tx_AB can be configured to provide a desired impedance for the two generic bands A and B, as well as appropriately high impedance for other frequency ranges. Further, some of such high impedance for one or more non-AB bands can be facilitated by an appropriately configured impedance matching circuit as described herein in reference to FIG. 6.

Figure 10:
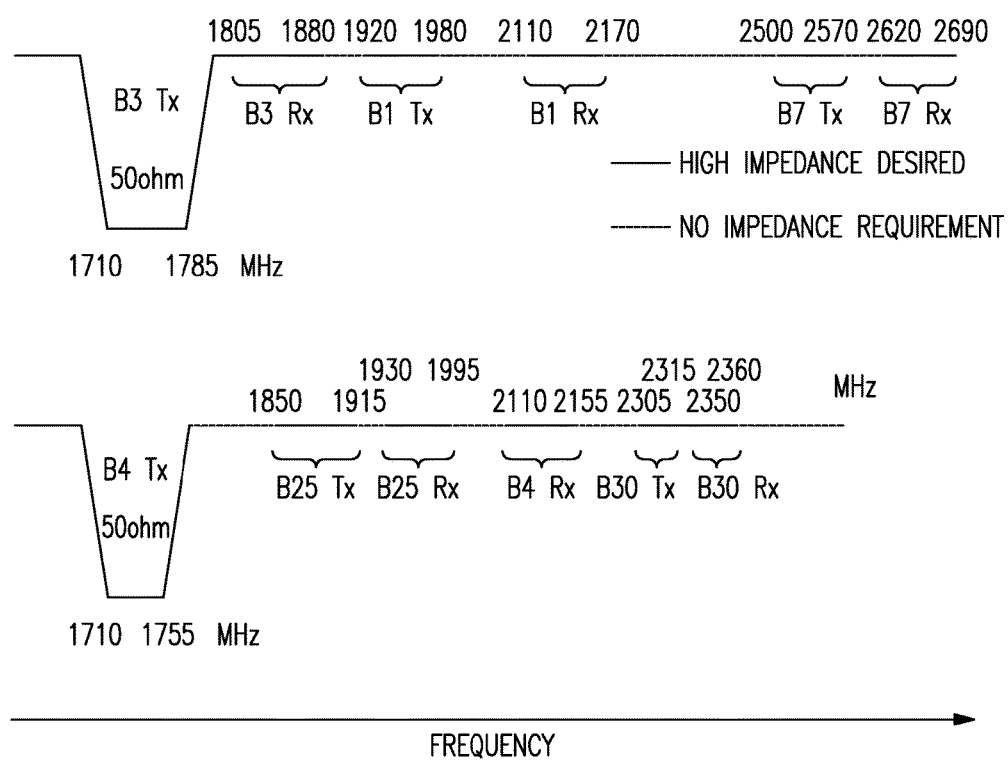
FIG. 10 shows an example of how a single transmit filter in the front-end architecture of FIGS. 8A-8C and 9A-9C can be configured to provide a desired impedance profile.

FIG. 10 shows an example where the single Tx filter (B3/B4_Tx) of FIGS. 8A-8C and 9A-9C can be a more specific example of the single Tx filter Tx_AB of FIG. 7. As shown in FIG. 10, the single Tx filter (B3/B4_Tx) can be configured to provide a desired impedance (e.g., 50 ohms) for each of the B3 and B4 bands, and high impedance values for other frequency ranges.

In the example of FIG. 10, one or more frequency ranges outside of the B3/B4 range can be provided with an appropriately high impedance. For example, high impedance values for the B7 Tx and B7 Rx frequency ranges can be facilitated by an appropriately configured impedance matching circuit 162 described herein in reference to FIGS. 5-9, to facilitate the example down-link carrier aggregation of B1/B3/B7 Rx bands (e.g., as in FIGS. 8A-8C). In another example, high impedance values for the B30 Tx and B30 Rx frequency ranges can be facilitated by an appropriately configured impedance matching circuit 162 described herein in reference to FIGS. 5-9, to facilitate the example down-link carrier aggregation of B4/B5/B30 Rx bands (e.g., as in FIGS. 9A-9C). In some embodiments, the same impedance matching circuit 162 can provide the foregoing functionality for both of the two example carrier-aggregation modes.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 11:
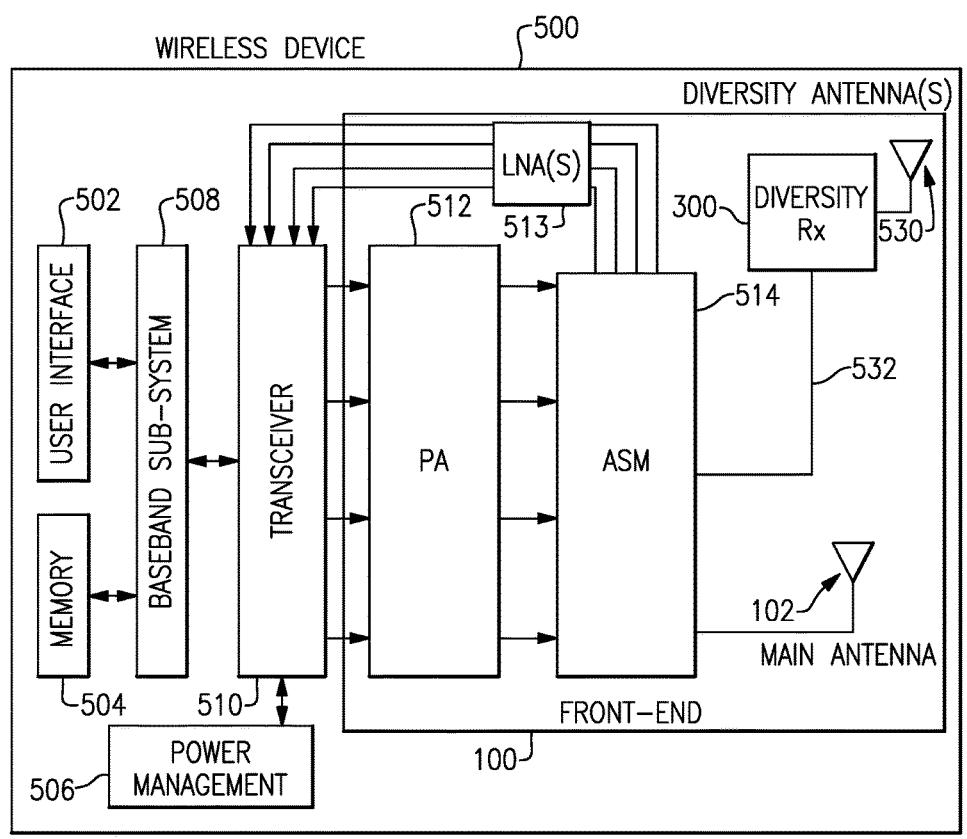
FIG. 11 depicts an example wireless device having one or more advantageous features described herein.

FIG. 11 depicts an example wireless device 500 having one or more advantageous features described herein. In some embodiments, such advantageous features can be implemented in a front-end (FE) architecture generally indicated as 100. In some embodiments, such a front-end architecture can be implemented as a front-end module (FEM) 100. Accordingly, the box indicated as 100 in the example of FIG. 11 can be a front-end architecture having one or more features as described herein, a FEM having one or more features as described herein, or some combination thereof.

As described herein, such an FE architecture can include, for example, an assembly of PAs 512, an antenna switch module (ASM) 514, an assembly of LNAs 513, and a diversity Rx module 300. Such components of the FE architecture 100 can operate as described herein with a main antenna 102. In some embodiments, one or more receive operations can be facilitated by a diversity antenna 530. As described herein, the diversity Rx module 300 can be configured so that its LNA is relatively close to the diversity antenna 530 which is preferably positioned relatively far from the main antenna 102.

PAs in the PA assembly 512 can receive their respective RF signals from a transceiver 510 that can be configured and operated to generate RF signals to be amplified and transmitted, and to process received signals. The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 3. It will be understood that at least some of the bands can be divided into sub-bands. It will also be understood that one or more features of the present disclosure can be implemented with frequency ranges that do not have designations such as the examples of Table 3.

TABLE 3

| Band | Mode | Tx Frequency Range (MHz) | Rx Frequency Range (MHz) |
|---|---|---|---|
| B1 | FDD | 1,920–1,980 | 2,110–2,170 |
| B2 | FDD | 1,850–1,910 | 1,930–1,990 |
| B3 | FDD | 1,710–1,785 | 1,805–1,880 |
| B4 | FDD | 1,710–1,755 | 2,110–2,155 |
| B5 | FDD | 824–849 | 869–894 |
| B6 | FDD | 830–840 | 875–885 |
| B7 | FDD | 2,500–2,570 | 2,620–2,690 |
| B8 | FDD | 880–915 | 925–960 |
| B9 | FDD | 1,749.9–1,784.9 | 1,844.9–1,879.9 |
| B10 | FDD | 1,710–1,770 | 2,110–2,170 |
| B11 | FDD | 1,427.9–1,447.9 | 1,475.9–1,495.9 |
| B12 | FDD | 699–716 | 729–746 |
| B13 | FDD | 777–787 | 746–756 |
| B14 | FDD | 788–798 | 758–768 |
| B15 | FDD | 1,900–1,920 | 2,600–2,620 |
| B16 | FDD | 2,010–2,025 | 2,585–2,600 |
| B17 | FDD | 704–716 | 734–746 |
| B18 | FDD | 815–830 | 860–875 |
| B19 | FDD | 830–845 | 875–890 |
| B20 | FDD | 832–862 | 791–821 |
| B21 | FDD | 1,447.9–1,462.9 | 1,495.9–1,510.9 |
| B22 | FDD | 3,410–3,490 | 3,510–3,590 |
| B23 | FDD | 2,000–2,020 | 2,180–2,200 |
| B24 | FDD | 1,626.5–1,660.5 | 1,525–1,559 |
| B25 | FDD | 1,850–1,915 | 1,930–1,995 |
| B26 | FDD | 814–849 | 859–894 |
| B27 | FDD | 807–824 | 852–869 |
| B28 | FDD | 703–748 | 758–803 |
| B29 | FDD | N/A | 716–728 |
| B30 | FDD | 2,305–2,315 | 2,350–2,360 |
| B31 | FDD | 452.5–457.5 | 462.5–467.5 |
| B32 | FDD | N/A | 1,452–1,496 |
| B33 | TDD | 1,900–1,920 | 1,900–1,920 |
| B34 | TDD | 2,010–2,025 | 2,010–2,025 |
| B35 | TDD | 1,850–1,910 | 1,850–1,910 |
| B36 | TDD | 1,930–1,990 | 1,930–1,990 |
| B37 | TDD | 1,910–1,930 | 1,910–1,930 |
| B38 | TDD | 2,570–2,620 | 2,570–2,620 |
| B39 | TDD | 1,880–1,920 | 1,880–1,920 |
| B40 | TDD | 2,300–2,400 | 2,300–2,400 |
| B41 | TDD | 2,496–2,690 | 2,496–2,690 |
| B42 | TDD | 3,400–3,600 | 3,400–3,600 |
| B43 | TDD | 3,600–3,800 | 3,600–3,800 |
| B44 | TDD | 703–803 | 703–803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front-end architecture comprising:
a first power amplifier having an output coupled to a transmit filter through a path that is substantially free of a switch, the transmit filter implemented as a single filter configured to support a first transmit band and a second transmit band, the first and second transmit bands at least partially overlapping with each other;
a receive filter implemented as a single filter configured to support at least a first receive band corresponding to the first transmit band; and
a second power amplifier having an output capable of being coupled to a first duplexer or a second duplexer through a selector switch, the first duplexer including a receive portion configured to support a second receive band corresponding to the second transmit band.

2. The front-end architecture of claim 1 wherein the receive filter is further configured to support a third receive band.

3. The front-end architecture of claim 2 wherein the first duplexer associated with the second power amplifier further includes a transmit portion configured to support a third transmit band corresponding to the third receive band.

4. The front-end architecture of claim 3 wherein the second duplexer associated with the second power amplifier includes a transmit portion configured to support a fourth transmit band and a receive portion configured to support a fourth receive band corresponding to the fourth transmit band.

5. The front-end architecture of claim 4 further comprising a third power amplifier having an output capable of being coupled to a third duplexer or a fourth duplexer through a selector switch.

6. The front-end architecture of claim 5 wherein the third duplexer includes a transmit portion configured to support a fifth transmit band and a receive portion configured to support a fifth receive band corresponding to the fifth transmit band.

7. The front-end architecture of claim 6 wherein the fourth duplexer includes a transmit portion configured to support a sixth transmit band and a receive portion configured to support a sixth receive band corresponding to the sixth transmit band.

8. The front-end architecture of claim 7 wherein the front-end architecture is configured to support a transmit operation for a selected transmit band among at least the six transmit bands, and to support a carrier-aggregation operation for a plurality of selected receive bands among at least the six receive bands.

9. The front-end architecture of claim 5 further comprising an assembly of antenna switches implemented to selectively connect an antenna port to one or more of the single transmit filter, the single receive filter, the first and second duplexers associated with the second power amplifier, and the third and fourth duplexers associated with the third power amplifier.

10. The front-end architecture of claim 9 wherein the assembly of antenna switches includes a single-pole-single-throw switch for each of the single transmit filter, the single receive filter, the first and second duplexers associated with the second power amplifier, and the third and fourth duplexers associated with the third power amplifier.

11. The front-end architecture of claim 10 wherein the first transmit band and the first receive band are transmit and receive portions of a B4 cellular band.

12. The front-end architecture of claim 11 wherein the second transmit band and the second receive band are transmit and receive portions of a B3 cellular band.

13. The front-end architecture of claim 12 wherein the third transmit band and the third receive band are transmit and receive portions of a B1 cellular band.

14. The front-end architecture of claim 1 further comprising an impedance matching circuit implemented at an output of the single transmit filter and configured to provide a high impedance for one or more frequency ranges outside of the first transmit band and the second transmit band of the single transmit filter.

15. The front-end architecture of claim 14 wherein the impedance matching circuit includes a switchable inductive shunt path to ground.

16. The front-end architecture of claim 14 further comprising an impedance matching circuit implemented at an input of the single receive filter and configured to provide a high impedance for one or more frequency ranges outside of the first receive band and the third receive band.

17. The front-end architecture of claim 1 wherein the first transmit band and the first receive band are transmit and receive portions of a first cellular band, and the second transmit band and the second receive band are transmit and receive portions of a second cellular band, each of the first and second cellular bands being a mid-band or a high-band.

18. The front-end architecture of claim 17 further comprising a low-band path having a low band pass filter configured to filter a low-band signal.

19. An antenna switch filter module comprising:
a packaging substrate configured to receive a plurality of components; and
a filtering circuit implemented on the packaging substrate, the filtering circuit including a first signal port coupled to a transmit filter through a path that is substantially free of a switch, the transmit filter implemented as a single filter configured to support a first transmit band and a second transmit band, the first and second transmit bands at least partially overlapping with each other; a second signal port coupled to a receive filter implemented as a single filter that is configured to support at least a first receive band corresponding to the first transmit band; and a third signal port and a fourth signal port, the third signal port coupled to a transmit portion of a first duplexer, the fourth signal port coupled to a receive portion of the first duplexer configured to support a second receive band corresponding to the second transmit band.

20. A wireless device comprising:

a transceiver configured to process signals;

an antenna configured to facilitate transmission and reception of the signals; and a front-end architecture implemented between the transceiver and the antenna, and including a first power amplifier having an output coupled to a transmit filter through a path that is substantially free of a switch, the transmit filter implemented as a single filter configured to support a first transmit band and a second transmit band, the first and second transmit bands at least partially overlapping with each other; a receive filter implemented as a single filter configured to support at least a first receive band corresponding to the first transmit band; and a second power amplifier having an output capable of being coupled to a first duplexer or a second duplexer through a selector switch, the first duplexer including a receive portion configured to support a second receive band corresponding to the second transmit band.

* * * * *